United States Patent
Berg et al.

[19]

[11] Patent Number: 6,115,114
[45] Date of Patent: Sep. 5, 2000

[54] LASER SCANNING SYSTEM AND APPLICATIONS

[75] Inventors: Johnny L. Berg, Escondido; Francis H. Gerhard, San Juan Capistrano, both of Calif.

[73] Assignee: Holometrics, Inc., Escondido, Calif.

[21] Appl. No.: 09/149,332

[22] Filed: Sep. 8, 1998

Related U.S. Application Data

[63] Continuation-in-part of application No. 08/631,165, Apr. 12, 1996, Pat. No. 5,831,719.

[51] Int. Cl.[7] .............................. G01C 3/08; G01B 11/28; G01B 11/10
[52] U.S. Cl. ..................... 356/5.13; 356/4.01; 356/380; 356/386
[58] Field of Search .................. 356/380, 379, 356/386, 387, 376, 5.13, 4.01

[56] References Cited

U.S. PATENT DOCUMENTS

| | | | |
|---|---|---|---|
| 3,604,805 | 9/1971 | Scott | 356/28 |
| 3,636,250 | 1/1972 | Haeff | 178/6.5 |
| 3,649,123 | 3/1972 | Ulicki | 356/5 |
| 3,778,159 | 12/1973 | Hines et al. | 356/5 |
| 3,840,293 | 10/1974 | Fine et al. | 350/285 |
| 3,991,417 | 11/1976 | Levine | 343/7.7 |
| 4,005,936 | 2/1977 | Redman et al. | 356/5 |
| 4,042,822 | 8/1977 | Brandewie et al. | 250/216 |
| 4,179,216 | 12/1979 | Theurer et al. | 356/4 |
| 4,299,484 | 11/1981 | Holzapfel | 356/28.5 |
| 4,413,904 | 11/1983 | Hamada et al. | 356/5 |
| 4,689,489 | 8/1987 | Cole | 250/560 |
| 4,721,385 | 1/1988 | Jelalian et al. | 356/5 |
| 4,723,448 | 2/1988 | Veligdan | 73/657 |
| 4,752,662 | 6/1988 | Takagi | 219/10.55 |
| 4,829,172 | 5/1989 | Miller | 250/205 |
| 4,855,830 | 8/1989 | Davis et al. | 358/168 |
| 4,935,616 | 6/1990 | Scott | 250/213 |
| 4,950,075 | 8/1990 | Ichinose et al. | 356/141 |
| 4,957,362 | 9/1990 | Peterson | 356/5 |
| 4,979,815 | 12/1990 | Tsikos | 356/1 |
| 4,995,102 | 2/1991 | Ichinose et al. | 342/148 |
| 5,000,567 | 3/1991 | Fleshner | 356/28.5 |
| 5,006,721 | 4/1991 | Cameron et al. | 250/561 |
| 5,029,999 | 7/1991 | Kremer et al. | 356/5 |
| 5,069,545 | 12/1991 | Hinz | 356/28.5 |
| 5,075,878 | 12/1991 | Ohtomo et al. | 364/569 |
| 5,164,733 | 11/1992 | Nettleton et al. | 342/54 |
| 5,200,606 | 4/1993 | Krasutsky et al. | 250/216 |
| 5,216,236 | 6/1993 | Blais | 250/203.2 |
| 5,267,010 | 11/1993 | Kremer et al. | 356/5 |
| 5,285,461 | 2/1994 | Krasutsky et al. | 372/29 |
| 5,353,073 | 10/1994 | Kobayashi | 351/221 |
| 5,661,561 | 8/1997 | Wurz et al. | 356/386 |
| 5,770,864 | 6/1998 | Dlugos . | |
| 5,815,274 | 9/1998 | Dlugos | 356/376 |
| 5,864,404 | 1/1999 | Amorosi | 356/379 |

*Primary Examiner*—Stephens C. Buczinski
*Attorney, Agent, or Firm*—Baker & Maxham

[57] ABSTRACT

A laser scanner sensor for measuring the spatial properties of objects in a scene within a range less than a predetermined maximum object distance. Applications of the laser scanner system includes measurement of the dimensional weight of parcel(s) being transported by a moving forklift. In the laser scanner sensor, a laser diode supplies a laser beam that is intensity-modulated by a reference waveform from a waveform generator. A variation of the optical scanning sensor system scans a field of measurement which the moving forklift traverses. The forklift has at least three retroreflectors attached to act as calibration targets within the viewing field. The scanner system intensity-modulates the laser beam, and receives reflected intensity-modulated light and supplies it to an optical processing system that includes an aperture that transmits a first percentage of light reflected from the maximum object distance and a second, lesser percentage of light reflected from objects closer than the maximum object distance. A photodetector receives the processed light and converts the energy into an amplitude-modulated range signal. Range values are then determined about every 0.1-inches along a scan line. A number of scan lines are assembled in the computer and displayed on a screen as a 3-D image. The 3-D image is then analyzed by the computer to extract the volume of the objects carried on the forklift tines. The volume is then converted to Dimensional Weight (DIM WT) which is used by the shipper to determine tare.

12 Claims, 12 Drawing Sheets

LASER SCANNING SYSTEM AND APPLICATIONS

RELATED APPLICATIONS

This application is a continuation-in-part application of U.S. patent application Ser. No. 08/631,165 filed Apr. 12, 1996, now allowed as U.S. Pat. No. 5,831,719.

BACKGROUND OF THE INVENTION

1. Field of the Invention

The present invention relates to scanning laser systems for mapping the three-dimensional features of objects in a scene. More particularly, the invention concerns use of the scanning laser system as applied to parcel transporting systems for automating the determination of shipping information of dimensional weight and parcel identification.

2. Description of the Related Art

Effective automation techniques for industry and business often require remote sensing to ascertain information about the particular process being monitored. A variety of sensors have come into existence for such remote sensing purposes, including sensors for measuring temperature, pressure, color, hardness, volume and distance. These devices have solved their respective sensing requirement to varying degrees of success.

Many sensing uses require quantification of the spatial relationship between objects in a scene, which generally involves describing the size, shape and geometry of objects in the scene as well as the spatial relationships between individual objects in the scene. Such spatial data is useful for manufacturing processes, metrology processes, materials handling, automated warehousing, quality control, security, robotic vision, and human vision substitutes, for example. One particularly promising sensor is a scanning laser radar, which uses visible or infrared lasers to obtain information about the scene of interest. Due to the small wavelengths of such lasers, the potential exists to perform very accurate measurements. Furthermore, the continuing development of laser diodes provides a cost effective source of laser radiation and the ability for high modulation rates. Broadly speaking, the laser scanner generates an intensity-modulated laser probe beam that is reflected off the object whose range is to be determined. A reference signal is generated in a waveform generator and this signal then drives a laser diode to produce an intensity-modulated waveform.

The amplitude-modulated laser beam is directed to a scanning system that includes at least a horizontal scanning mirror driven by a constant-speed motor. Many scanning systems also use a vertical scanning mirror orthogonally positioned with respect to the horizontal scanning mirror. The combination of the horizontal scanning mirror and the vertical scanning mirror allow the laser beam to scan an entire area with the intensity-modulated laser beam. Upon reflection from the object, the intensity modulation continues in the reflected beam and as a result, the reflected beam has the same type of intensity modulation as the probe beam, but with a different phase due to the additional distance it travels. When the reflected beam returns, the light energy is converted to electrical energy by a photodetector, and the phase of the intensity-modulated reflected beam is compared with the phase of the reference signal and a distance measurement can be obtained.

Generally, as the amplitude modulation becomes higher in frequency, accuracy increases. However, high frequency electrical signals, for example a 100 MHZ signal, can be substantially distorted during subsequent electrical processing and particularly the zero crossings can be shifted, which can substantially degrade accuracy of the subsequent phase measurement. In previous systems, mixers have been used to down-convert the original frequency of the amplitude-modulation to a lower frequency before processing, thereby allowing more accurate, lower frequency processing. However, there is still room for improvement in signal processing.

Other range sensing technologies include television sensors, imaging sensors utilizing CCD arrays, acoustic ranging sensors, and radar.

Television sensors are available which operate in the visible or near infra-red parts of the electromagnetic spectrum. Although an individual sensor provides two-dimensional (2-D) imagery, techniques have been developed for obtaining 3-D scene descriptions through use of techniques such as binocular vision and structured light. These approaches have never been widely accepted because of the computational complexity and time involved in extracting the desired scene data. In addition, controlling factors such as scene lighting balance, lighting intensity, etc. have proven to be very difficult.

Imaging sensors utilizing CCD arrays exist for obtaining images of a scene. Such CCD arrays can operate in the visible, near infra-red or the far infra-red (10–14 micrometer wavelengths). CCD techniques are analogous to the TV sensor approach described above with the exception that the far infra-red band provides a solution for operating any time of day by exploiting specific wavelengths of natural emissions from scene objects at temperatures around 300° K. However, extraction of 3-D data has the same limitations as TV.

Acoustic ranging sensors also exist, similar to Kodak camera acoustic ranging sensors. Techniques using such acoustic ranging sensors are unsuitable for imaging uses because of the inherent lack of precision of range measurement and the wide beam angle.

Radar systems operate in a variety of different wavelengths, from many meters to millimeters. Radar technology has been developed to a high degree for military and aviation applications; however, wide beam angles and lack of required ranging accuracy prevent their successful application in industry and manufacturing.

One application of the laser ranging and scanner system is related to parcel transporting equipment for monitoring the shipping of parcels. The shipping of parcels from point A to point B has been a continual challenge to commerce. In recent years, with the development of certain efficiencies of transport and materials handling, carriers have been able to offer shippers mixed modes of transport, overnight delivery, better tracking of parcel movement, and discount rates in return for the utilization of labor and cost saving measures such as: bar coding; bulk delivery; and pre-sorting.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by forklift operation using personnel to manually determine dimensional weight.

U.S. Pat. No. 5,770,864 entitled "Apparatus and Method for Dimensional Weighing Utilizing a Laser Scanner or Sensor" teaches of such methods and apparatus for measuring the dimensions of a parcel. The apparatus taught therein uses a laser scanner device with conveyor moving equipment. The laser scanner is positioned and rotated within various positions so as to locate the edges of the parcel and sides of a parcel on the conveyor belt. The positioning data is then transmitted to a data processor which calculates the length, width, and height of the parcel and then converts these parameters to the "cube" of the packages.

The present invention provides a more cost effective and accurate way for determining a parcel's dimensional weight "DIM Weight" using moving transporting machinery such as a forklift without the need of stopping while making volume measurements. The ability of the shipper to enjoy reductions in rates from carriers by implementing certain efficiencies in operation, and to do so without slowing work flow or driving up costs, is just one of many advantages to be gained by the user of the invention herein.

SUMMARY OF THE INVENTION

A laser scanner is disclosed herein for measuring the spatial properties of objects in a scene. The scene includes one or more objects within a range less than a predetermined maximum object distance. The laser scanner includes a waveform generator that generates a predetermined reference waveform and a laser diode that supplies an intensity-modulated laser beam responsive to the reference waveform. An optical scanning system receives the laser beam, and scans the scene with the intensity-modulated laser beam. The optical scanning system also includes optics for receiving reflected intensity-modulated light from the objects in the scene. An optical processing system is provided for processing the reflected intensity-modulated light. The optical processing system includes an aperture that transmits a first percentage of light reflected from the maximum object distance and a second, lesser percentage of light reflected from objects closer than the maximum object distance. A photodetector is positioned to receive the processed intensity-modulated light from the optical processing system, and convert energy in the incident light into an amplitude-modulated range signal. A mixer is provided to down-convert the frequency of the range signal into a lower (IF) frequency. A first electrical circuit receives the down-converted range signal and converts it into a converted waveform that has, preferably, the form of a square wave with falling and rising edges that correspond to the zero crossings in the amplitude-modulated range signal. The reference waveform is also applied to a mixer that down-converts it to the IF frequency. A second electrical circuit receives the down-converted reference waveform and converts it a second converted waveform. A phase comparator receives the first and second converted waveforms and outputs a highly accurate signal indicative of the phase difference therebetween.

Preferably, the reference waveform has a sinusoidal shape and therefore the intensity-modulated laser beam has a sinusoidally-varying intensity. Also, the second electrical circuit preferably includes a circuit for converting the reference waveform into an approximately square waveform so that said second converted waveform comprises the square waveform.

In some embodiments, a calibration target may be situated within the scene. The calibration target has a plurality of steps with predefined distances between them, and is situated at a known distance from the optical components. During scanning, the phase difference at the reflected surfaces is stored. During subsequent processing of scanned object data, the stored information is used as a calibration to provide accurate range measurements.

The invention herein is a method and apparatus for measuring dimensions of a parcel using a transporting machine, the scanner devices and methodology, and preferably using a forklift as the transporting machine. The inventions method comprises a series of steps for determining volume of the parcel. The steps begin with the placing of a parcel, preferably with a bar code identification attached, on a flat surface such a pallet; the flat surface upon which the parcel is placed can be the weighing surface of a scale capable of calculating the weight of the parcel. In the preferred method, the pallet is on the tines of a forklift that interlink with a scale device for weighing the parcel. Personnel operating the transport machine such as the forklift, reads the bar code from the parcel and registers the weight of the parcel, preferably by a scanning device. Using appropriate radio frequency transmitting equipment mounted to the transporting machine, parcel identification and weight information is automatically transmitted to a remote parcel processing computer. Next, either personnel or automated machine move the parcel within the viewing field of measurement of the laser scanner sensor as taught herein which is preferably portioned above the parcel.

In the preferred embodiment of application, the laser scanner is fixed in relation to at least three retroreflectors mounted along a center line and preferably on top of the moving transporting machine and the alignment of these retroreflectors are parallel to the moving transports velocity vector. The retroreflectors provide time and space reference for volumetric measurements of the parcel. The laser scanner provides line scans of the parcel(s) as it passes within the field of measurement. Two of the retroreflectors define a known distance between scan lines. The number of lines between the retroreflectors is a function of the rate of motion of the transporting machine. The third retroreflector has a known distance to the laser scanner sensor system and is preferably mounted to the forklift head. The volume of the cargo item is determined regardless of the height or tilt angle of the forklift tines as set by the forklift operator. This advantage is enabled by determining the angular deviation from horizontal of the forklift tines by the geometry the retroreflectors attached to the transporting machine. As the transporting machine moves in the field of measurement of the scanning sensor, line scans of the parcel are made where a data processor then calculates an aspect and height of the parcel, from which the volume of the parcel can then be determined, thereby yielding dimensional weight of the parcel. Moreover, bar codes attached to a parcel can be scanned by either an operator who performs bar code scanning on the transport machine or a stationary bar code scanner as the transporting machine moves in the field of measurement. Transmitting equipment attached to the transporting machine can then provide information of a parcel which is correlated with a scanning event.

Thus, automated processing of parcels dimensional weight information and identification can be effectively and efficiently performed. As is apparent to those skilled in the art, the calculated aspect and height of the parcel can then be displayed on a monitor and/or transmitted to a parcel processing system. Additionally, the measured weight can be transmitted to a parcel processing system. The method uses a minimum of required hardware while leaving open the possibilities for optional hardware and processing capability such as remote parcel processing systems which allow the parcel dimensions to be further utilized for shipping and carrier processing. The system features identified above are significant in terms of being able to accurately measure the volume of the parcel in the 3-D imagery. The apparatus, system and method significantly improves efficiency, timeliness and productivity in warehousing and air cargo operations.

DETAILED DESCRIPTION OF THE PREFERRED EMBODIMENTS

An apparatus and related method is disclosed herein for scanning a scene area of interest and rapidly and accurately providing a 3-D mapping of the size, dimensions, geometry and spatial relationships of and between objects in the scanned area. Operator intervention in the scene is minimal or even unnecessary. The general system configuration is shown in FIG. 1.

Figure 1:
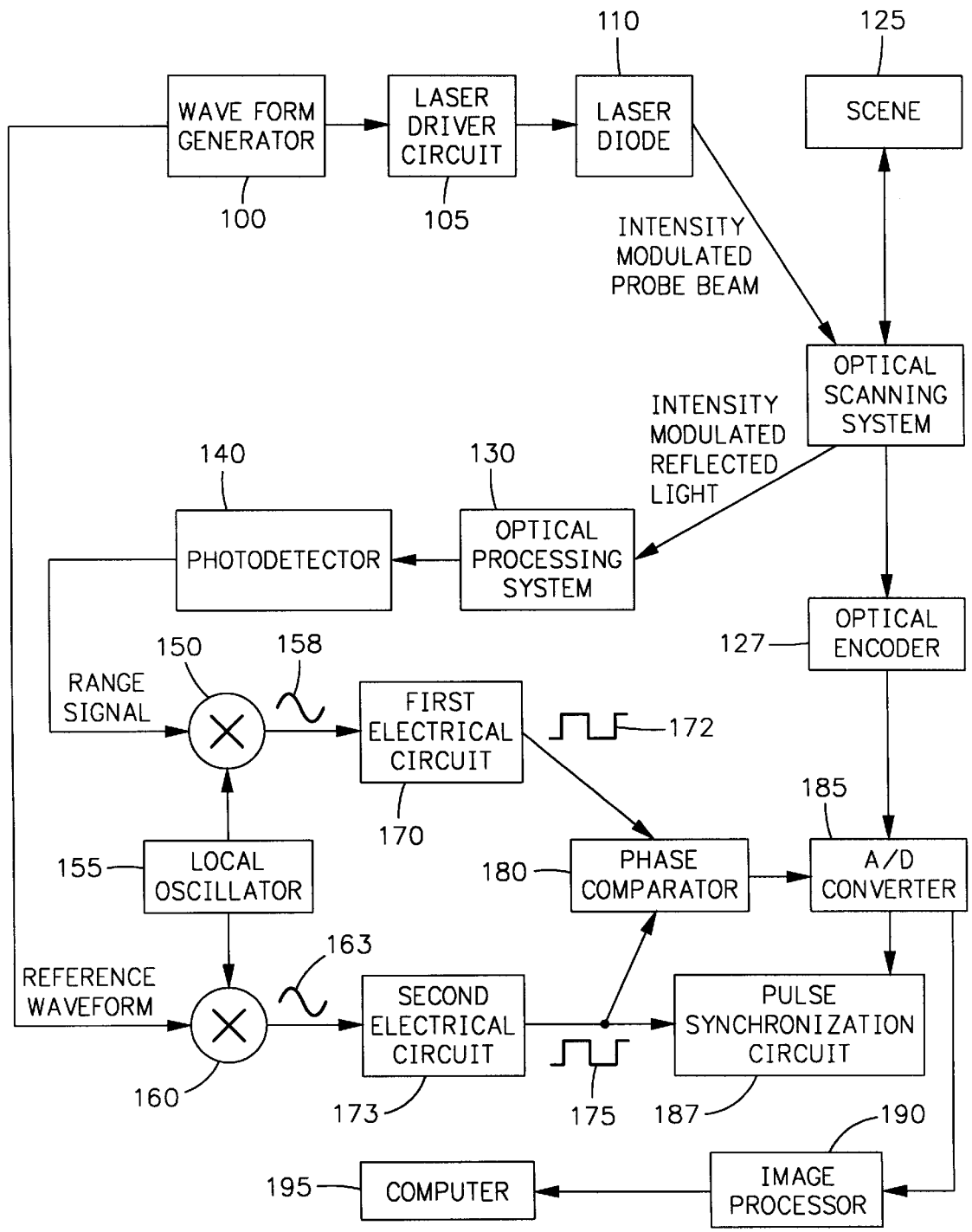
FIG. 1 is an overall block diagram of the laser scanner described herein.

FIG. 1 is a block diagram of a laser scanner system for measuring objects in a scene. For most uses, the scene will have a plurality of objects located within a specified range interval. The expected operational configuration of objects and the background are used to define a predetermined maximum object distance. The laser scanning system includes a waveform generator 100 which generates a predetermined periodic reference waveform based on the maximum measurement distance. Preferably, the reference waveform has a sinusoidal shape, but in other embodiments the reference waveform may have other shapes. The preferred waveform generator 100 is controlled by a precision crystal oscillator, which can be changed to provide different frequencies in order to respond to different sensing distances.

The waveform generator 100 is connected via a laser driver circuit 105 to a laser diode 110. Solid state diode lasers are available operating in the visible or near infra-red (IR), with a range of output powers from 0.1-milliwatts to 12-watts. These lasers can be operated from a DC output to modulation frequencies of tens of GHz. Modulation of the laser beam is required when utilizing phase comparison ranging techniques, and the laser diode 110 is a laser diode whose intensity can be modulated at high frequencies. Such laser diodes are highly cost-effective at the present time. Thus, responsive to the reference waveform, the laser diode supplies an intensity-modulated laser beam.

The laser beam from the laser diode is applied to an optical scanning system 120, described in detail with reference to FIG. 2, that scans the scene illustrated in block at 125 with the intensity modulated laser beam. The optical scanning system 120 also receives a reflected intensity modulated light from the objects in the scene. Particularly, as the scene is scanned, the reflected light from the scanned section is received and applied to an optical processing system 130.

The optical processing system 130 includes optical processing equipment such as described with reference to FIG. 3 that processes the intensity-modulated light. The optical processing system includes an intensity-control aperture that transmits a first percentage of light reflected from the maximum object distance and a second, lesser percentage of light reflected from objects closer than the maximum object distance. As will be described further in more detail with reference to FIGS. 3 and 4, the amount by which the aperture reduces intensity is directly related to the closeness: the closer the object, the greater the percentage of light that is blocked by the aperture.

The light energy from the optical processing system 130 is applied to a photodetector 140, which converts the energy in said light into an amplitude-modulated range signal. The range signal is applied to a mixer 150 that also receives a predetermined local oscillator (LO) frequency from a local oscillator 155. The resulting output signal, as illustrated by a waveform 158, is down-converted in frequency to an IF frequency. That is, the effect of the mixer 150 and local oscillator 155 is to substantially reduce the frequency of the signal down to the IF frequency for subsequent processing. Advantageously, such frequency reduction reduces the distortion during subsequent processing in the first electrical circuit 170, for example.

The reference waveform from waveform generator 100 is, at the same time, applied to a mixer 160 that also receives the LO frequency from the local oscillator 155. The result is a down-converted reference waveform 163 that has the same IF frequency as the down-converted range signal 158. The down-converted range signal 158 is applied to a first electrical circuit 170 that converts the amplitude modulated range signal to a converted waveform 172 having falling and rising edges that correspond to the zero crossing in the amplitude modulated frequency down-converted range signal 158. Similarly, the down-converted reference waveform 163 is applied to a second electrical circuit 173 that converts the down-converted reference waveform into a second converted waveform 175 that has falling and rising edges that correspond to the zero crossing in the down-converted reference waveform. Preferably, the first electrical circuit and second electrical circuit convert the input signals into an approximately square waveform so that the first and second converted waveforms comprise a square wave.

The first and second converted signals are applied to a phase comparator 180 in which the two signals are compared and a DC voltage is output indicative of the phase difference between the two signals. The signal from the phase comparator is applied to an analog to digital (A/D) converter 185. The A/D converter 185 is sampled responsive to an optical encoder 127 that is coupled to the optical scanning system 120 to sense the position of the mirrors and provide a regular sampling interval. As will be described later in more detail, sampling preferably occurs at predetermined spatial intervals that provide consistent output readings regardless of any ripple in the phase comparator output voltage. Particularly, the second converted waveform 175 is applied to a pulse synchronization circuit 187, described in more detail with reference to FIG. 12, that generates a digital pulse synchronized to the ripple and samples the signal at the A/D converter 185 to minimize the effect of ripple.

The output of the A/D converter 185 is applied to an image processor 190, which is in turn controlled by a computer 195. The computer and image processor form the basis for providing application-specific computations.

A waveform generator that has a selectable frequency allows the system design to accommodate the required ranging distance interval by selecting an appropriate laser modulation frequency ($f_m$). The measurement interval $R_m$ (meters) corresponding to this modulation frequency is:

$$R_m = c/2f_m \qquad \text{(Eq. 1)}$$

where c=velocity of light ($3 \times 10^8$ meters/sec) It should be noted that when the range is less than $R_m$, the phase shift will be less than $2\pi$ radians. When the range is exactly equal to $R_m$, then the phase shift is exactly $2\pi$ radians. A phase shift of $2\pi$ radians looks the same as 0.0 radians or $4\pi$ radians. Thus, an ambiguity interval is defined characteristic of the phase measurement ranging technique. The ambiguity interval starts at 0-radians of phase difference when $R_m$ is 0.0 meters and increases to $2\pi$ radians at the maximum value of $R_m$. At this point the ambiguity interval starts again at 0.0 radians and increases to $2\pi$ radians when the range reaches $2R_m$. This cyclical process continues as the range increases. Thus, in order to remove this ambiguity as to which interval the measurement was made in, a frequency should be selected which has a wavelength comparable to the maximum range contained in the volume of interest.

Figure 2:
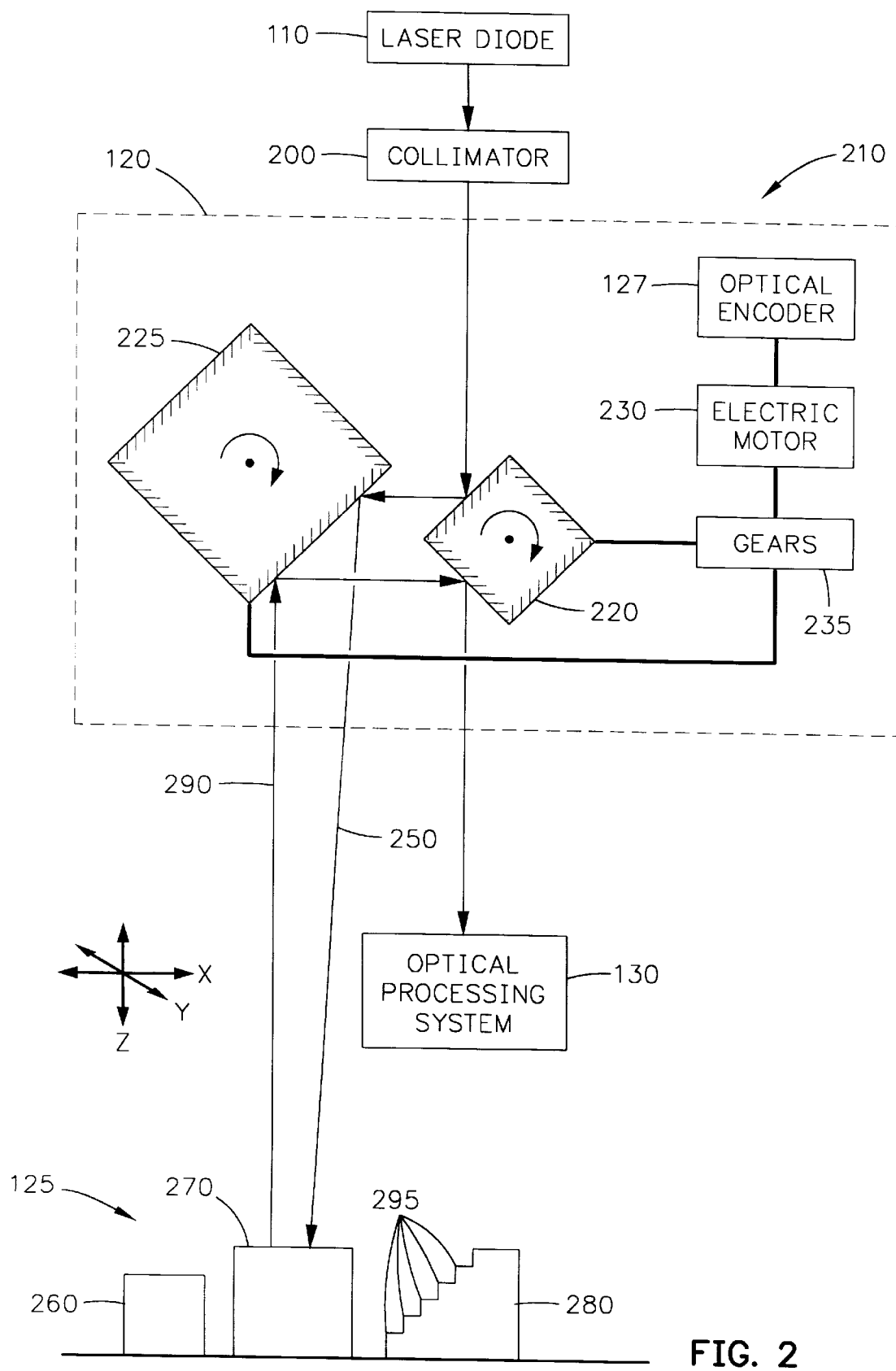
FIG. 2 is a diagram illustrating the optical scanning system and a scene including two objects and a calibration target.

Reference is now made to FIG. 2, which is a diagram illustrating, in more detail, the optical scanning system 120 shown in block in FIG. 1. The intensity-modulated laser beam 110 from the laser diode 110 is applied to a conventional collimator 200 that restricts the rapidly diverging beam emitted from a laser diode thus providing an approximately non-diverging laser beam. The laser beam output from the collimator 200 is applied to an optical system 210 that includes cube mirror 220 and, optionally, a second four-sided mirror 225. The first mirror 220 is provided to scan in the horizontal direction. Motive force is provided by an electric motor 230 through a gear box or other arrangement 235. The gear box 235 mechanically couples the two mirrors thus providing a very rugged and long-lasting scanning configuration. The optical encoder 120 observes the position of the first cube and provides an output indicative of its position. As the cube 220 is rotated at, for example 2400 RPM, each mirror face scans one horizontal line. The rotational rate can be adjusted over a wide dynamic range, with an increase in speed resulting in an increased data rate. The four-sided vertical scanning mirror 225 provides vertical scanning in the instance when the objects in the scene are not moving. For many applications, two mirrors (i.e. a horizontal scanning mirror and a vertical scanning mirror) will be utilized, and because this is a more specific case, it will be described. It should be clear that if only one mirror is necessary, that the second mirror will be simply omitted, and the known velocity and position of the scene will be taken into account by the processing system, particularly the image processing system. The laser beam reflected from the mirrors illustrated at 250 is directed to a scene 125 that, for example, includes a large rectangular square box 260, a narrow box 270 and a calibration target 280, comprising a plurality of steps that will be described in more detail subsequently. The light reflected from the object box 270 in the scene, illustrated at 290, includes the original intensity modulation in the outgoing beam 250. The reflected light 290 is reflected off of the second mirror 225, the first mirror 220, and to the optical processing system 130 which will be subsequently described in more detail, for example with reference to FIGS. 3 and 4.

The calibration target 280 includes a plurality of steps, sometimes referred to as sites 295, each site having a known position in three-dimensional space with respect to the scanning system 210. As each of the sites 295 are scanned, the processor in the subsequent processing system calibrates the phase difference reading to the known, specific distance of each calibration site. Thus, an exact measurement of the space difference corresponding to a known distance can be obtained. The calibration target 280 may comprise many shapes. For example, the calibration sites can be pins, or precisely machined stair-stepped items (as shown). The resulting calibration data is of course acquired at specific times during sensor operation, and any required correction can be applied to each range measurement obtained during that scan cycle. The target 280 may be included in every scene that is scanned, thereby providing an accurate measurement of each scene as it changes. For example, a calibration target may be provided at the edge of a scene, and the different objects may be loaded and unloaded onto the spot next to it, without disturbing the calibration target. In embodiments in which the object is moving, the target 280 may be positioned on a stationary location within the scene to allow continual accurate range measurements.

Once collected, the range data can be used in a number of ways. For example, the system may be instructed to convert range data to shades of gray and then displayed on a computer screen. Accordingly, the closer an object is to the sensor, the darker its color. Conversely, the greater the distance, the lighter its color. In one embodiment, the 3-D images includes about 100,000 individual pixel elements (range measurements) with each pixel given a specific shade of gray in the image. The spatial resolution in the scene is approximately 0.050-inches in x, y (length, height) and 0.2-inches in z (range to the pixel). Analysis of this image allows one to characterize the size, orientation and geometry's of objects located in the scene as well as define the spatial relationships between objects. Another example is using the length, width and height data to compute the volume of the two boxes 260, 270.

The following discussion concerns the accuracy with which the scene can be measured. In this case we must discuss accuracy in measuring x and y as well as the accuracy in making the range measurement. It will be assumed that x represents the horizontal position in an image and y represents the vertical direction in the image. The x dimension is set through use of the optical encoder 127 that accurately measures the angle that the first rotating mirror 220 has turned. The greater the number of counts for a given rotation the smaller the distance between measured points along x, at a specific distance. The accuracy of y is determined by the rotation rate of the second mirror with respect to the first mirror. In order to achieve a pixel in which x and y distances are equal requires that the second mirror rotation rate be 2300 times slower than the first mirror. This speed reduction is accomplished through a mechanical drive train which includes a speed reduction device. The accuracy at which these two dimensions are measured is much less than the pixel distance. In the current configuration, the optical encoder provides 10,000 counts per revolution of the small mirror (and scan motor). The encoder count plus the mechanical linkage/speed reduction to the second mirror yields a square 0.050"×0.050" pixel at a range of about 12-feet from the object. The accuracy that the range measurement can be accomplished is more complicated in definition. The accuracy that range can be measured is embodied in a gaussian statistical process which is governed by the ambiguity interval ($R_m$.) and the Signal-to-Noise ratio (S/N) in the detector channel. The accuracy (1-sigma uncertainty) of the range measurement ($R_{accuracy}$) related to S/N and $R_m$ in the following equation:

$$R_{accuracy} = \frac{R_m}{4\sqrt{2}\,(S/N)\sqrt{n}} \quad \text{(Eq. 2)}$$

where n=number of samples averaged. The S/N for the Silicon:Avalanche Photodiode used in this system is defined as:

$$S/N = \frac{(P_r R_o M)}{(2q[i_s + (i_b + P_r R_o)M^2 F]B)^{1/2}} \quad \text{(Eq. 3)}$$

where $P_r$=Laser signal power on the detector (watts)
$R_o$=Detector Responsivity (amps/watt)
M=Gain of Avalanche Photodiode Diode (APD)
q=Electronic charge
F=Excess Noise Factor
B=Electronic bandwidth of system (Hz)
$i_s$=dark surface current
$i_b$=dark bulk current Eq. 3 indicates that the dark bulk current is amplified by the APD detector. Since the gain (M) is approximately 100, this noise component can become quite large which is a problem when the laser-related current (the numerator in Eq. 3) is small due to low reflection from the scene object. The dark surface current is not amplified and remains almost constant if the detector temperature remains constant.

Eq. 3 is influenced most heavily by the $P_r$ term. The reason is that $P_r$ can vary as much as a factor of 1000 due to variations in object reflectivity, angle of incidence, range to the target, type of reflection (specular vs. Lambertian), aperture size, variations in laser output power, etc. The way that the received signal influences the phase measurement is described below.

Assume that two sinusoidally-varying signals are input to a phase detector; i.e., an electronic device that provides a DC voltage output proportional to the phase difference between the two sinusoids. Further, assume that the two signals, signal one and signal two, are defined by the two equations given below:

$$\text{Signal one: } R_1 = A_1 * \sin(\omega t) \quad \text{(Eq. 4)}$$

$$\text{Signal two: } R_2 = A_2 * \sin(\omega t + \phi) \quad \text{(Eq. 5)}$$

In other words, both signals have the same frequency but signal two is phase offset by $\phi$. Responsive to these two signals, the phase detector averages the product of these two sine waves over many, many cycles and outputs a voltage proportional to the phase difference (range) from the sensor to the object scanned by the laser radar. Particularly, as can be seen from the following Eqs. 6, 7 and 8, the voltage out of the phase detector is related to the cosine of the phase difference between them. In some phase detectors the voltage out of the phase detector has the following form:

$$V(out) = \frac{A_1 * A_2}{2}\cos(\phi) \quad \text{(Eq. 6)}$$

In another approach that utilizes a synchronous rectifier technique, the voltage out of the phase detector has the following form:

$$V(out) = \frac{A_2}{2}\cos\phi. \quad \text{(Eq. 7)}$$

In the technique disclosed herein, a phase measurement approach is used, with the phase detector having the following form:

$$V(out) = k\cos(\phi) \quad \text{(Eq. 8)}$$

where "k" is a constant that depends upon the circuit configuration and other second order factors. To first order, the phase detector disclosed herein is insensitive to variations in $A_2$; however, there are second order effects related primarily to variations in zero-axis crossings of $A_2$. For the reasons described below, the approach of Eq. 8 has been utilized because it minimizes the effects of $A_2$ variations.

Signal one supplies a reference frequency with a constant amplitude $A_1$. Signal two is the range signal since it is the detector output corresponding to reception of the signal reflected from objects in the scene. The phase is indicative of the time required for the laser beam to accomplish the round trip from the sensor to the scene, and return, and causes a phase difference between the two signals. Since the surface reflectivity from objects in the scene can vary as well as the angle of incidence between the laser beam and the object's surface normal, $A_2$ varies dynamically with the scanning beam, thus resulting in a voltage output that is varying because of amplitude changes. Consequently, one major system design issue that must be addressed in the electronics for the laser radar is that the electronics must give the correct range reading even though $A_2$ may vary in amplitude. Otherwise, one will not get range measurements from the phase comparator that vary only with φ. In general, one addresses this issue in terms of the sensor electronics' "dynamic range", which is the amount of amplitude variation in $A_2$ that can be accommodated without affecting the output voltage of the phase detector. In order to keep the dynamic range within acceptable limits, adequate signal conditioning must occur prior to the signal entering the phase detector.

Therefore, it would be advantageous to provide a system that, at least partially, normalizes the signal provided from the detector such that the zero axis crossings, as influenced by $A_2$, do not influence the value of k in Eq. 8 to first order. As will be described, this advantage is provided by various features including the optical processing system 130, appropriate electrical processing circuits, and other techniques including the calibration described herein. These advantages also provide improved performance for the approaches described in Eqs. 6 and 7. Results of the preferred embodiment have shown ranging accuracy (1-sigma) better than 0.1 inches, which opens up a wide range of applications for laser ranging sensors such as the following: automated materials handling, automated warehousing, determining "dimensional weight" for air cargo companies, bin picking, robotic guidance and navigation, vision substitutes, and automated baggage handling.

The four-sided vertical scanning mirror 225 is an improvement over conventional two-sided scanning mirrors disclosed widely in the prior art. This four-sided mirror 225 provides a much more rugged optical configuration that has an ability to withstand very severe industrial environments without substantially affecting optical alignment or pointing accuracy. Preferably, the mirrors on both the vertical scanning mirrors 225 and horizontal scanning mirrors 220 are diamond-turned aluminum mirrors coated to provide greater than 99% reflectivity at the laser wavelength of interest. When the two mirrors are used (both the vertical and horizontal mirrors) they are interconnected with a mechanical drive train that provides a 2300:1 angular velocity reduction in the vertical scanning mirror 225.

In operation, the 3-D system optical axis is pointed at a predetermined beginning point in the scene and the mirrors of the 3-D system then are controlled to scan the entire scene with an intensity-modulated beam of coherent radiation, e.g. a laser beam. Preferably, the laser beam is modulated with a sinusoidal reference waveform with the result that the beam has a sinusoidally-modulated intensity variation imposed on it. If the scene objects of interest are moving at a known velocity and direction, a single scan mirror can be used to scan the beam perpendicular to the velocity vector of the object at an angle approximately normal to the object surface. However, if the objects are stationary in the scene, two, orthogonally scanning mirrors are used to generate a range image of the scene (each point in the image is a range point). The first mirror provides a horizontal line scan of the surface. The second mirror moves the line in the vertical direction. The net result of these two scan mirror movements generates a TV-like "raster scan" of the scene.

As described above, when the beam strikes objects in the scene, it is then reflected from the object surface. These reflections are specular (mirror-like), Lambertian (diffuse reflection as from a paper surface), or some combination of both. A portion of the reflected laser radiation is detected by the sensor receiver and an electrical signal is produced that varies with intensity, resulting in an amplitude-modulated signal. The amplitude-modulated detector signal is then compared in phase with the original signal used to modulate the laser and the phase difference between the two signals is measured in a phase detector circuit. The measured phase difference provides a direct measure of range to a specific spot in the scene. Continuous measurement of the phase difference as the beam scans across the entire scene field-of-view results in the extraction of a 3-D image which is very analogous to a conventional contour map.

OPTICAL PROCESSING

From the above discussion, it can be seen that the phase comparator output is greatly affected by the amplitude of the signals as well as their phase. This can be a problem because reflections from close objects have a higher amplitude than reflections from objects farther away. Because the received beam intensity 290 and object range are related by a power of two, the difference between the energy reflected from close and far objects can be significant. For example, if the distance to an object is increased by a factor of two, the received reflected beam's intensity will decrease by a factor of four. If the range increases by a factor of four, the received intensity will decrease by a factor of 16. Such large variations cause difficulties in accurate phase measurement, as well as difficulties in designing sensing electronics; for example, it can be difficult to effectively set the gain of an amplifier to prevent saturation of high-level signals while still providing effective gain at low signal levels. Therefore, it would be useful to provide some way to reduce the signal intensity variations, so that the intensity received by the photodetector is at least partially normalized for intensity variations.

Figure 3:
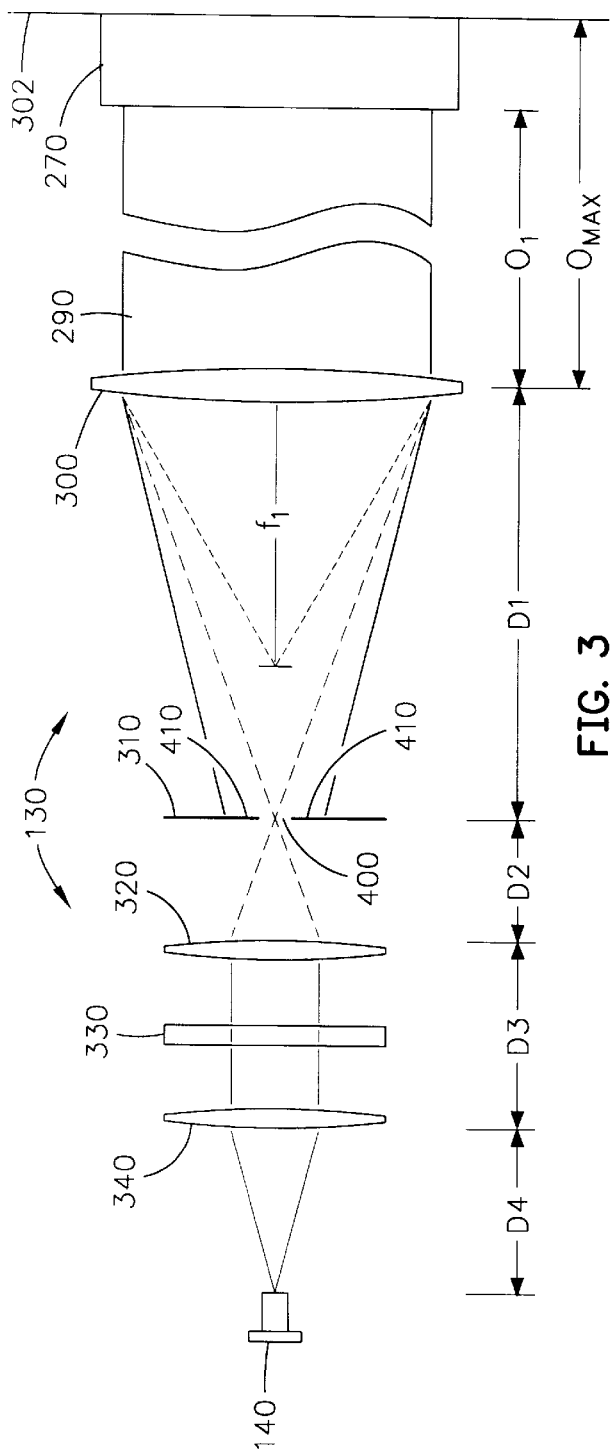
FIG. 3 is a side view of the optical processing system including an intensity-control aperture situated to limit passage of reflections from closer objects.

Reference is now made to FIG. 3, which is a side view of the preferred embodiment of the optical processing system 130 that is positioned for reviewing a reflected light beam 290 from the object 270. Preferably, all the focusing elements in the system design include a new optical material having an axially varying refractive index, which is now available under the trade name Gradium™. This material allows lens designs with much shorter focal length and thus allows smaller dimensions in the optical processing system 130. Furthermore, this material can provide for spot sizes an order of magnitude smaller than conventional glass lens. The optical processing system 130 includes a collecting lens 300 positioned to receive the reflected light beam 290 off the surface of the object 270. For purposes of illustration, a distance $o_1$ is used to define the optical path between the surface of the object 270 and the collecting lens 300, and a distance $O_{MAX}$ denotes the optical path distance between the maximum object distance, which in this instance is a wall or floor, for example 302, and the collecting lens 300. The collecting lens 300 has a focal length $f_1$, as shown in FIG. 3.

An intensity-control aperture 310 is spaced apart from the collecting lens at a predetermined distance D1. Preferably, the aperture is circular, and the distance D1 is equal to a distance $i_o$ from the collecting lens, the distance $i_o$ being defined as the image plane distance for an object located at the maximum distance $O_{MAX}$. The value for the optimum distance $i_o$ can be calculated using the lens-maker's formula. In other embodiments, the intensity-control aperture may be positioned at a greater distance from the focusing lens. However, if it were to be placed closer than the distance $i_o$, then unwanted intensity variations could occur.

A collimating lens 320 is positioned with its focal point approximately aligned at the intensity-control aperture 310, so that the beam exiting the collimating lens 300 is collimated. The collimated beam is applied through a narrow band filter 330 having a transmission characteristic designed to pass the laser frequency of the laser beam emitted by the laser diode. Following the narrowband filter 330, a focusing lens 340 is used to focus the collimated, narrowband beam on the photodetector 140.

Figure 4:
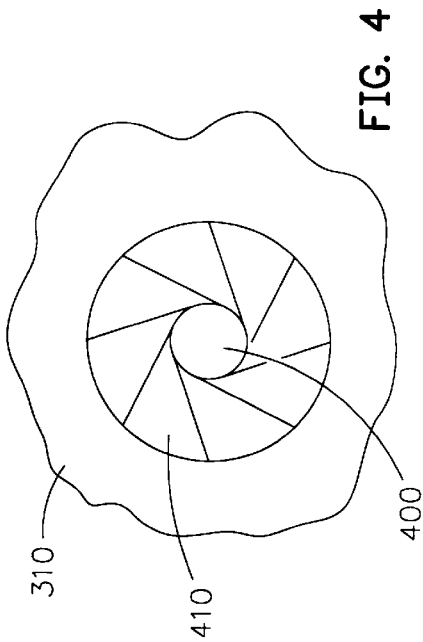
FIG. 4 is a view of the intensity-control aperture, illustrating the limiting effect of the area around the aperture.

Advantageously, the intensity-control aperture 310 restricts light energy from closer reflections. By doing so, the phase difference between the two signals can be more accurately measured. An example of this is shown in FIG. 4, in which the central area of the intensity-control aperture 400 is open to allow passage of light, and the surrounding area is opaque and therefore blocks light. Therefore, light originating from the maximum object length can pass through the center open area 400 unimpeded; however, light from closer reflections is increasingly blocked by the area 410 surrounding the center area. As a result, the energy of closer reflections is increasingly blocked by the area 410 surrounding the intensity-control aperture.

Thus, the aperture in the optical processing system is another feature that operates to provide an approximately constant range value, in spite of a varying intensity of the reflected beam, which may be due to variations in range between the reflecting surface and the collecting lens. Furthermore, advantageously, the position of the centroid of the area disk on the surface of the photodetector 140 is maintained at approximately the same position. The following explains, in more detail, how the system works to provide a relatively constant intensity on the detector surface. If the reflecting surface moves toward the collecting lens (i.e., moves closer) then the light intensity impinging upon the collecting lens will increase because of the decrease in the ratio $1/o_1^2$. However, due to the decrease in the object distance, the image plane will change and reside at a more distant location (a larger D1) and therefore the beam diameter at the intensity-control aperture will be larger. As a result, a portion of the beam will be removed by the intensity-control aperture. Since the object distance has changed, the collimating lens will not be in the correct distance from the intensity-control aperture, thus yielding a beam that will be slightly diverging. The result is that the focus of the focusing lens will not be exactly on the detector surface which will further result in reducing the intensity of the beam hitting the detector surface. Finally, even though the intensity of the beam upon the detector has been reduced, the centroid of the airy disk will be maintained in a constant position. It is useful to maintain the centroid of the focused spot in a constant position on the detector in order to reduce the influence of a trapping phenomenon associated with impurities doped into the surface of the detector to improve quantum efficiency. The influence of the trapping phenomenon can directly (and adversely) affect the zero axis crossing of the range signal

ELECTRICAL CIRCUIT FOR PROCESSING THE RANGE SIGNAL

As discussed above with reference to FIG. 1, the laser scanner system measures the distance to an object (the "range") by reflecting a beam off the object and determining the difference between the phase angle of the reflected light beam with respect to a reference signal. The photodetector 140 is utilized to convert the reflected light signal into the electrical range signal, which is supplied to the mixer 150 that provides a down-converted range signal 158 to the first electrical circuit 170.

One problem relating to accuracy is caused by intensity variations in the reflected beam. Particularly, intensity variations in the laser beam incident upon the photodetector 140 cause corresponding amplitude changes in the electrical range signal, which affects the amount of distortion in subsequent electrical processing circuits. As a further problem, the output of the phase comparator 180 also responds to variations in the amplitude of the two input signals supplied thereto. Each of these problems cause accuracy errors as a function of signal intensity.

Figure 5:
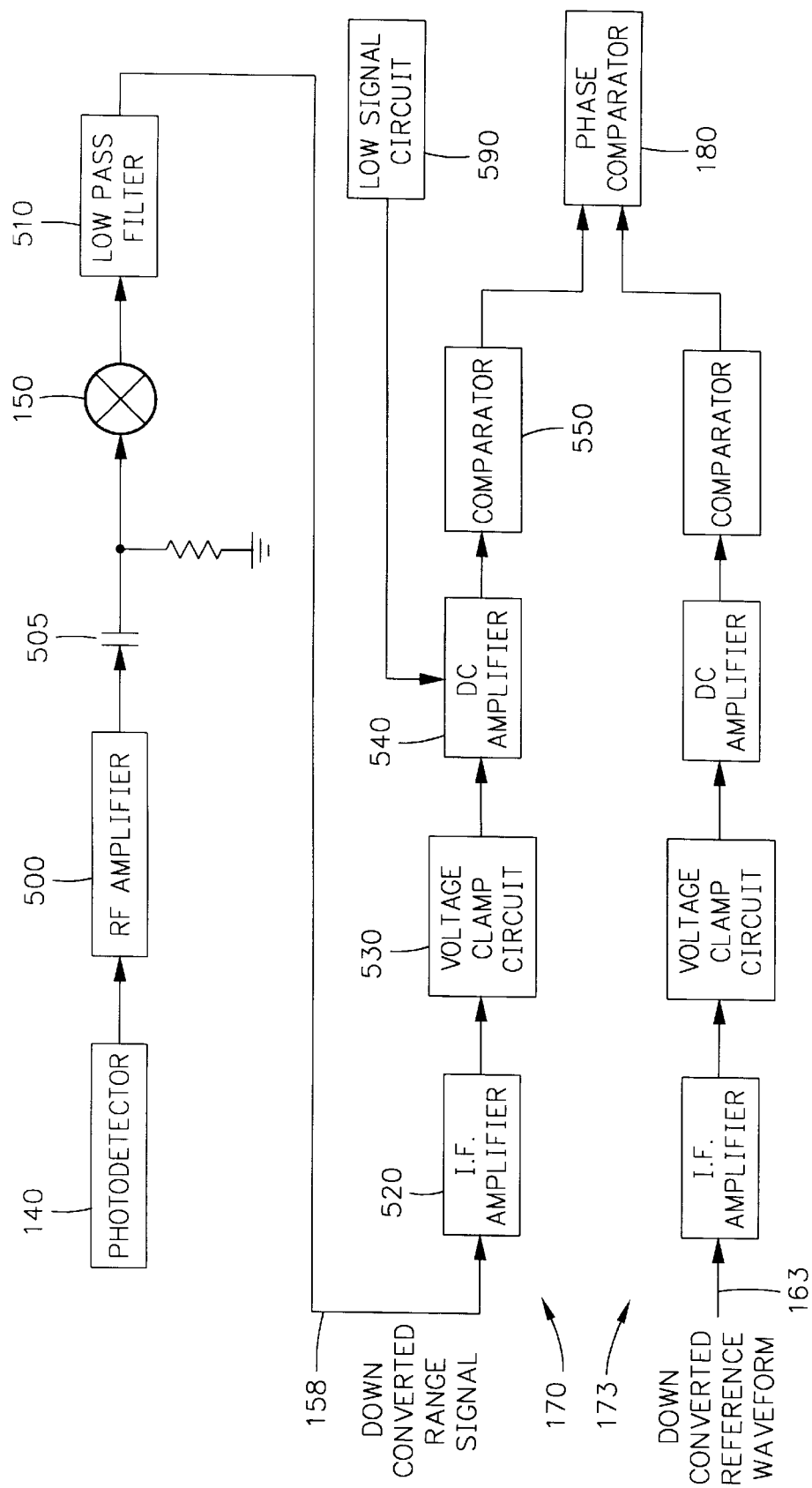
FIG. 5 is a block/circuit diagram of electrical processing circuits for the range signal and the reference waveform.

Reference is first made to FIG. 5. The electrical range signal from the photodetector 140 is first applied to a radio frequency (RF) amplifier 500 that, preferably has a minimum gain sufficient to boost the signal level for effective mixing. The output signal from the RF amplifier 500 is applied to a high pass RC filter 505 and then to the mixer 150, which, as described in more detail with reference to FIG. 1, down-converts the signal to a lower frequency. As a result, distortion during subsequent processing is reduced. The signal from the mixer is applied through a second low pass filter 510 to the first electrical circuit 170 that is described further below. The low pass filter 510 is useful to remove high frequencies generated in the mixing process. The mixer 150 operates to reduce the relatively high laser modulation frequencies (for example, in the 10 MHZ to 1,000 MHZ range) into a lower frequency, for example between 2 and 4 MHZ. The mixer 150 translates these frequencies down to a lower, intermediate frequency (IF), which reduces the distortion upon processing by subsequent stages, and secondly requires only a small gain in the RF amplifier 500. It is known that distortion in amplifiers can be reduced by utilizing negative feedback. However, this technique is less effective at high frequencies due partly because the loop gain of the amplifier is reduced. Thus, the amount of distortion in these amplifiers can be proportional to signal level. The mixer minimizes the number of amplifier stages that must handle the higher frequency utilized to modulate the laser beam. The benefit of having a low gain is obtained in the RF amplifier 500 and as a result of this very small gain, the output signal level and the resulting distortion will also be small. During subsequent processing, the signal levels will be higher, but due to the lower IF frequency, distortion will be smaller.

In the preferred embodiment, the first electrical circuit includes an IF amplifier 520, a voltage clamp circuit 530 followed by a DC amplifier 540 which is then followed by a comparator 550. The processed output from the comparator 550 is supplied to the phase comparator 180. All stages up to the voltage clamp circuit 530 are RC-coupled to block variations in DC levels. In other embodiments, more than one clamp circuit can be employed to provide a greater range of signal variation.

The IF amplifier 520 provides the level of gain necessary for subsequent processing. The voltage clamp circuit 530 limits the maximum voltage of the signal, and thereby at least partially normalizes the signal for intensity variations. The DC amplifier 540 adds further gain before the signal is applied to the comparator 550. Because all the phase information is included in the zero axis crossing (and not in the amplitude) the limiting of the amplitude by the Shottky diodes within the voltage clamp circuit 530 does not introduce error. The gain in the AC amplifiers is restricted so that they are not overdriven when the intensity of the reflected laser beam is at a maximum because, when overdriven, the AC amplifiers may require a lengthy time to recover. On the other hand, when the intensity is minimum, it may be desirable to have more gain in order to present the largest possible signal to the comparator 550. Particularly, the comparator 550 converts the zero axis crossings of the electrical signal to a square wave that has a consistent amplitude.

Figure 6:
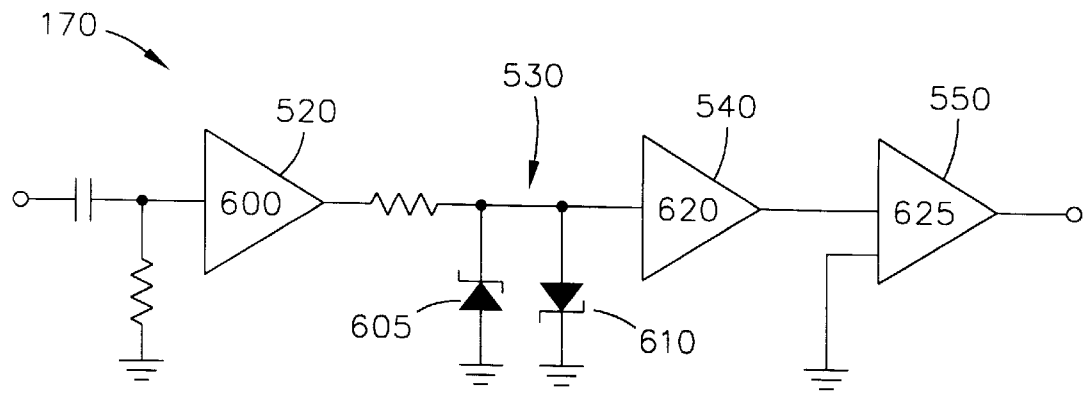
FIG. 6 is a circuit diagram of one embodiment of the first electrical processing circuit.

FIG. 6 is a circuit diagram of one embodiment of the first electrical circuit 170. The IF amplifier 520 is represented by the amplifier 600, and the voltage clamp circuit 530 includes a first Shottky diode 605 and an oppositely configured second Shottky diode 610 coupled in parallel between ground. The DC amplifier 540 is represented by an amplifier 620 and the comparator 540 is represented by an amplifier 625. The output of the comparator 550 is a square wave, whose amplitude is independent of the input signal, whereas the transitions of the output square wave are accurately representative of the input signal zero axis crossings. Furthermore, the slope of the transitions at the input of the comparator are increased and the slope does not vary with the input signal amplitude, which reduces errors caused by slope variations at the zero axis crossing of the input signal. As a result, the circuit virtually eliminates variations in the amplitude and variations in the rise and fall times of the input signal to the phase comparator 180, thereby reducing or eliminating errors due to variations in the reflected light beam's intensity.

LOW SIGNAL CIRCUIT 590

In some situations, the amplitude of the reflected light beam is very small, such as when the reflective surface is mirror-like, and is at a non-normal angle to the incident laser beam. In this instance, the reflected beam has a very low amplitude and in that instance, without correction, the system may not be able to accurately determine the zero crossing and could put out a totally erroneous range reading. For example, if the bottom of the measurement volume is a floor having a pattern of highly reflective spots, the collimated beam is deflected when it hits one of these spots, and virtually none of the laser energy is reflected back to the detector. As a result, a totally erroneous range reading can cause a significant error.

Referring again to FIG. 5, a low signal circuit 590 is coupled between the DC amplifier 540 and the comparator 550. The low signal circuit 590 senses the signal at the output of the DC amplifier 540, and if below a predetermined level, the low signal circuit 590 supplies a signal to the comparator 550 to that has the effect of changing the range output voltage of the phase comparator 180 to correspond to a predetermined range. Preferably, this predetermined range is that of the floor. In this instance, the range of the floor must be known and supplied in advance to the system. In other embodiments, a low signal can be sensed, and responsive thereto an indication can be sent to the computer and a correction can be done in software. In still other embodiments, the low signal may be detected at other nodes in the circuit, for example at the input of the DC amplifier 540. Furthermore, the alternate range value could be adjustable so that for different geographic locations or different object measurements, different values would be utilized. Thus, any means of detecting a low range signal amplitude and a means of altering the range output voltage to a predetermined value is provided, or alternately, a means for detecting a low range signal can be applied, and this fact can be communicated to correct the erroneous reading in software.

CURRENT SOURCE

Figure 7:
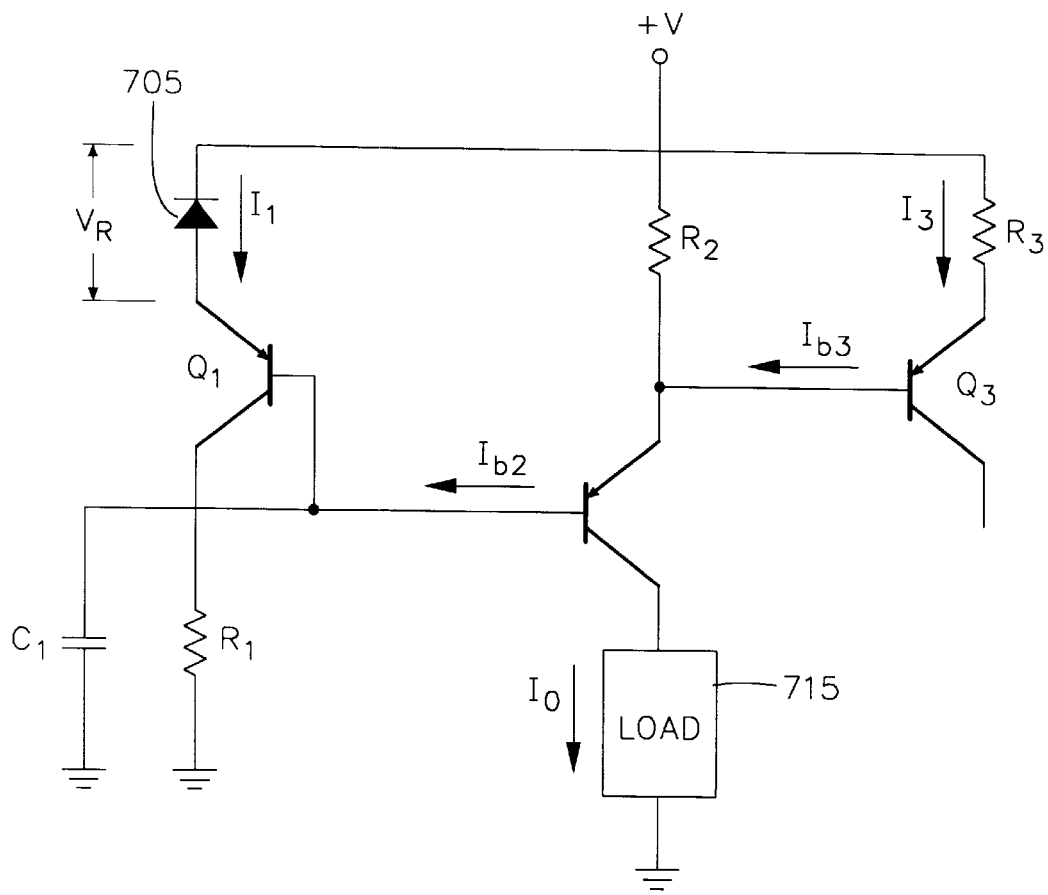
FIG. 7 is a circuit diagram of the preferred current source.
Figure 10:
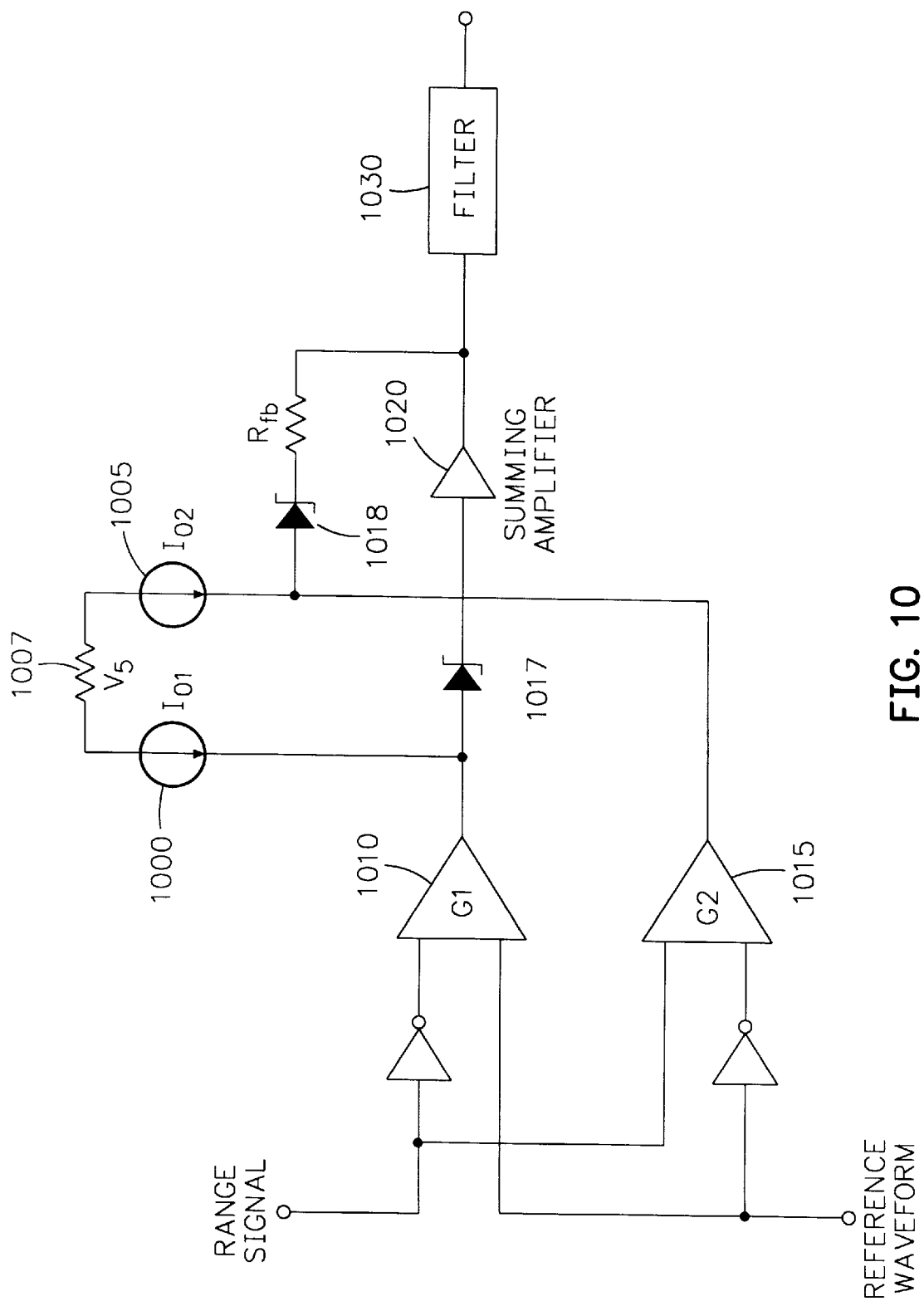
FIG. 10 is a circuit diagram of the preferred phase comparator.

FIG. 7 is a circuit diagram of the preferred current source used in the phase comparator 180, which is shown in FIG. 10 and described with reference thereto. The preferred current source of FIG. 7 provides a highly accurate and stable current source to the time varying load presented by the phase comparator. The high frequency characteristics are excellent even when the current is supplying a switched load. The AC equivalent circuit (shown in FIG. 8) closely approximates a perfect current source shunted by the collector capacitance of a single high frequency transistor.

Referring to FIG. 7, transistors $Q_1$, $Q_2$, and $Q_3$ are matched bipolar junction transistors (BJTs) implemented in an integrated circuit, which means that the characteristics of all three transistors including their gain ($\beta$) are almost identical. Because they are within an integrated circuit, all three devices are maintained at the same temperature. A zener diode 705 is reverse-coupled between the voltage source +V and the emitter of transistor $Q_1$. The zener diode functions as a precision voltage reference $V_R$ between V+ and the emitter of $Q_1$. The base of $Q_1$, is coupled to its collector, and therefore functions as a diode. A resistor $R_1$ is coupled between ground and the collector of transistor $Q_1$. The second transistor $Q_2$ has a base coupled to the base and collector of $Q_1$. The collector of $Q_2$, which provides the desired current $I_o$, is coupled to supply the fixed current to a load shown at 715 between the collector of $Q_2$ and ground. The load 715 is representative of the circuits that receive the current $I_0$. A second resistor $R_2$ is coupled between the voltage source +V and the emitter of transistor $Q_2$. The resistors $R_1$ and $R_2$ are selected so that the currents through $Q_1$ and $Q_2$ are equal. Under these conditions, the base-emitter voltage drops in $Q_1$, and $Q_2$ will be approximately equal and the voltage across $R_2$ will be equal to $V_R$. Because of the matched characteristics of the transistors, the voltage across $R_2$ remains constant at $V_R$ over a wide temperature range in spite of the 2 mV/° C. temperature coefficient of the base-emitter drops.

Ignoring $Q_3$ for the moment, the output current $I_o$ from the collector of $Q_2$ equals $I_2$ (which is the current through $R_2$) minus $I_{b2}$ (which is the base current in $Q_2$). The base current $I_{b2}$ is approximately equal to $I_2$ divided by the common emitter current gain $\beta$. The temperature coefficient of $\beta$ is approximately 1%/° C. Writing the equation for $I_0$. using the approximation that relates $\beta$ to the emitter current and base current (i.e. $\beta = I_e/I_b$)

$$I_o = I_2 - I_2/\beta + I_2*(1\%*dT)/\beta \qquad \text{(Eq. 9)}$$

where dT is the change in temperature.
For a typical value of 30 for $\beta$, $$I_o = I_2*(1.0 - 0.03333 + 0.000333*dT) \qquad \text{(Eq. 10)}$$

The temperature coefficient of output current is then 333 PPM/° C.

In order to reduce the temperature coefficient, the transistor $Q_3$ is coupled to provide the extra current to compensate for $I_{b2}$. The transistor $Q_3$ has a base coupled to the emitter of $Q_2$, and a collector coupled to ground. A resistor $R_3$ is coupled between the voltage source +V and the emitter of $Q_3$. The value of $R_3$ is selected so that $I_3$ (the current through $R_3$) is equal to $I_2$ and therefore $I_{b3}$, the base current through $Q_1$, is equal to the base current through $Q_2$, tracking it over the entire temperature range. Together with $I_2$, $I_{b3}$ flows into the emitter of $Q_2$. Although a small portion of this current ($I_{b3}$) flows out of the base of $Q_2$, the bulk of $I_{b3}$ flows out of the collector of $Q_2$ to compensates $I_o$ for the flow $I_{b2}$ out of the base of $Q_2$. Stated mathematically:

$$I_o = I_2 - [I_2*(1-1\%*dT)/\beta] - (I_3*1\%8dt)/\beta \qquad \text{(Eq.11)}$$

Therefore: $I_0 = I_2 - I_2/\beta$
Consequently, within the limitations of our approximations, the temperature variations cancel.

The capacitor $C_1$, is coupled between ground and the base of $Q_2$ so that the capacitor $C_1$, effectively grounds the base of $Q_2$ at high frequencies. By grounding the base of transistor $Q_2$, a configuration is provided that has a very high output impedance, which is useful for a current source.

Figure 8:
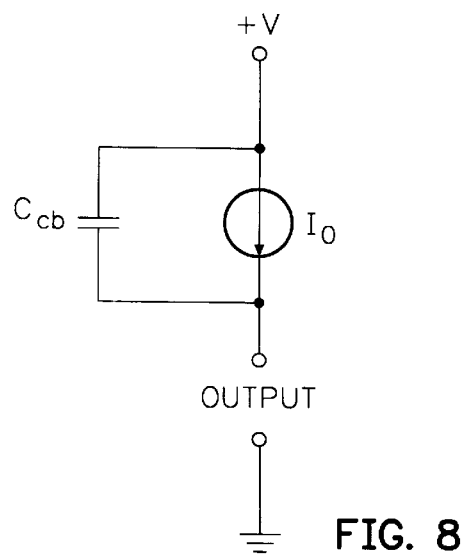
FIG. 8 is a circuit diagram of the high frequency output impedance of a common base transistor stage.

FIG. 8 is a simplified representation of the current source shown in FIG. 7. Particularly, the high frequency output impedance of a common base transistor stage is represented in FIG. 8 as a current source supplying $I_o$ in parallel with a capacitance shown at $C_{cb}$, which is the collector-base capacitance of $Q_2$ plus any stray capacitance in the circuit wiring.

Figure 9:
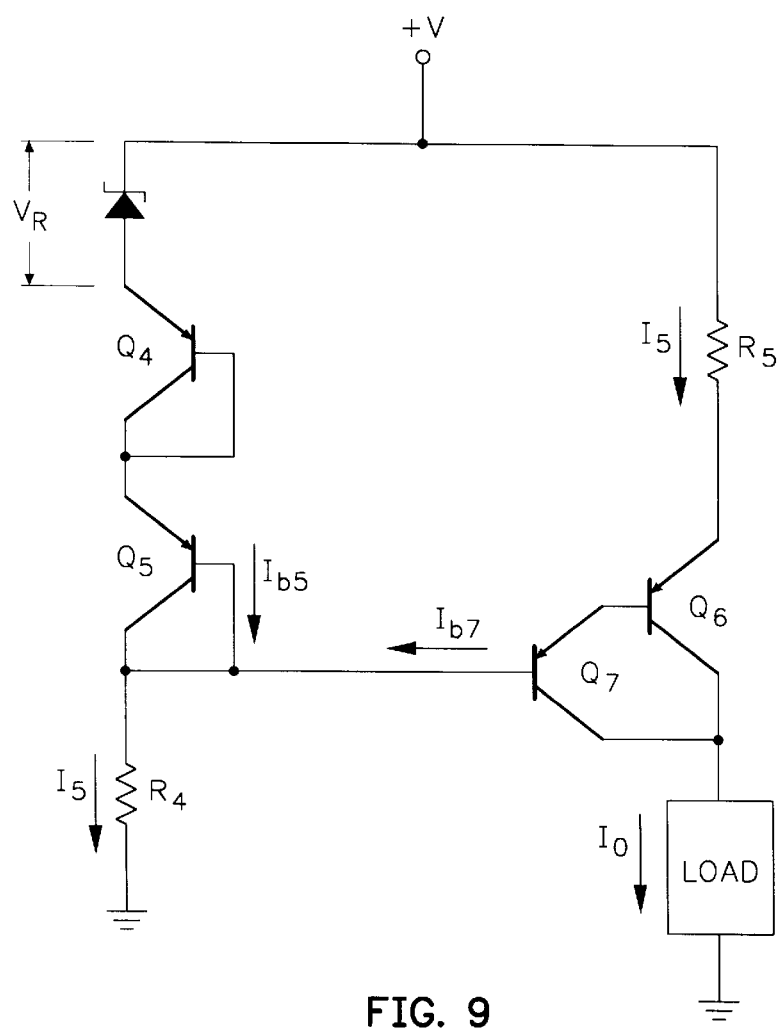
FIG. 9 is a circuit diagram of a Darlington configuration current source.

There are other current sources that can provide different ways of compensating for the temperature coefficient of collector current in the transistors. FIG. 9 is a circuit diagram of a current source that uses a Darlington configuration to compensate for temperature variations. Although functional, this circuit has two drawbacks:

1. The output capacitance is doubled over the preferred embodiment, and
2. The base current $I_{b7}$ from $Q_7$ is lower than the base current $I_{b5}$ from $Q_5$ and therefore temperature compensation of the base emitter drops is degraded.

The embodiment of FIG. 7 is preferred.

THE PHASE DETECTOR

The phase comparator 180 (sometimes referred to as a "phase detector") outputs a DC voltage whose instantaneous value is proportional to the phase angle of the received light signal. By their basic nature, phase detectors also put out a small amount of ripple at the input signal frequency and harmonics of that frequency, which sometimes results in random errors in the range readings.

Ripple can be reduced by increasing the operating frequency of the phase detector, but this will increase other frequency dependent errors in the phase detector. Another approach to reduce ripple is to use very long time constant filters at the output of the phase detector, however, that approach increases the response time of the system to steps and other variations in the range value, which degrades the image. Good dynamic response is highly desirable.

Three techniques are disclosed to reduce ripple without introducing the above kinds of errors.

FULL WAVE SYSTEM

In a full wave system, information is transmitted to the output of the phase detector at each zero axis crossing of the detector. Consequently, the output ripple primarily includes only harmonics of the input frequency and therefore permits a higher frequency filter to be used. The circuit described herein includes a provision for adjusting the two halves of the detector to minimize the fundamental frequency output of the filter.

FIG. 10 is a block diagram of the preferred embodiment of phase comparator 180. Two current sources including a first current source 1000 and a second current source 1005, each preferably comprise circuitry as shown in FIG. 7 above. The voltage $V_s$ from a voltage source is supplied to a variable resistor 1007 that is adjustable to equalize the currents $I_{o1}$ and $I_{o2}$ that flow, respectively through the first current source 1000 and the second current source 1005. By balancing the current, the fundamental component of the ripple can be minimized.

The processed range signal from the first electrical circuit 170 and the processed reference waveform from the second electrical circuit 173 are both supplied to a first gate 1010 and a second gate 1015, which are open collector AND gates. The output of the first gate 1010 is coupled to the output of the first current source 1000 and to a first Schottky diode 1017. The output of the second gate 1015 is coupled to a second Schottky diode 1018 and to the output of the second current source 1005. The outputs of the first and second Schottky diodes are coupled to an input of a summing amplifier 1020. A feedback resistor $R_{fb}$ is coupled between the output and input of the summing amplifier. A filter 1030 is coupled to the output of the summing amplifier in order to remove unwanted frequency components. When the output of the first gate is high, current $I_{o1}$ flows through the first diode to the input of the summing amplifier 1020. When it is low, $I_{o1}$ is shunted to ground by the gate. The same is true for $I_{o2}$.

Figure 11:
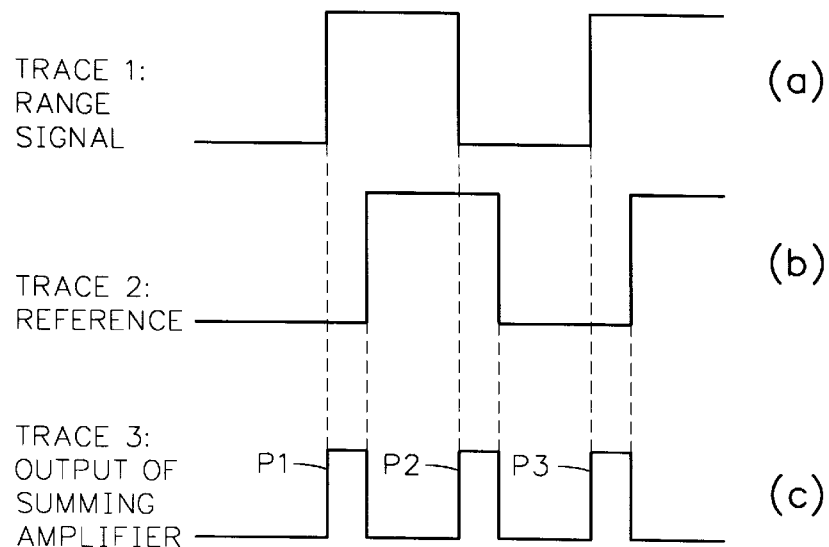
FIG. 11A is a graph of a first reference waveform.
FIG. 11B is a graph of a second reference waveform.
FIG. 11C is a graph of the output of the summing amplifier output responsive to the first and second reference waveforms.

FIGS. 11A, 11B and 11C show exemplary range signal and reference waveforms. Optionally, the range signal is the same as the reference waveform except for a delay by an amount proportional to the distance to the target. The output of the first gate will be true and current $I_{o1}$ will flow into the amplifier summing junction when the reference signal is true and the range signal is false, which results in pulses P1 and P3 in FIG. 11C. By the same reasoning, when the reference signal is false and the range signal is true the output of G2 is true and $I_{o2}$ flows into the summing junction. This results in pulse P2 in FIG. 11C.

By examining the three waveforms (FIGS. 11A, 11B and 11C), it can be seen that when the delay of the range signal relative to the reference signal is zero, the output pulse is zero. When the range signal delay is 180°, the output pulse is maximum. The average of the output waveforms is directly proportional to the width of the pulse, which is directly proportional to the delay of the range signal.

If the height and width of all of the pulses are the same, the fundamental component will be zero. The heights of alternate pulses can be adjusted to be equal by means of the variable resistor 1007 (FIG. 10). To a limited extent the variable resistor can also be used to compensate for width variations.

Bessel Output Filter

Preferably, the filter 1030 coupled to the output of the summing amplifier is a linear phase (also known as Bessel filter) step response filter. The effect of this filter is to approximate a delay, which results in less time distortion of the range output, allowing a longer time constant filter to be used for a given permissible amount of step response error, reducing ripple.

Synchronization of Digitization and Ripple

The output of the phase detector is digitized periodically by the A/D converter 185, and the resultant range data is sent to a computer for processing. By deriving the digitize command from the phase detector reference signal, each sample of the output waveform can be taken at a fixed point in the phase detector output ripple waveform. By this technique, the error due to ripple can be made smaller and also made to be fixed rather than random. The latter can be biased out whereas an error random in time cannot.

Figure 12:
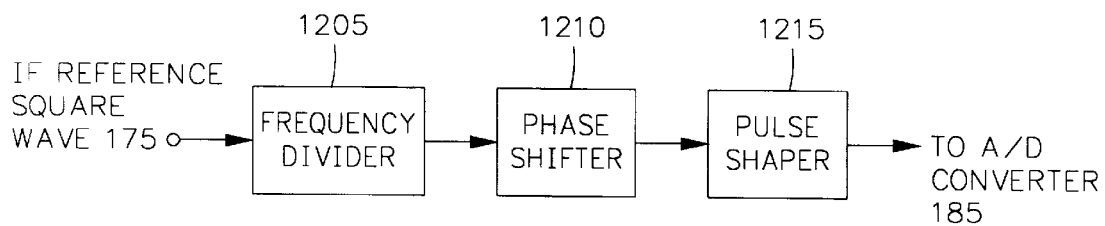
FIG. 12 is a block diagram of a circuit to compensate for ripples in the signal output from the phase comparator.

FIG. 12 is a block diagram of the pulse synchronization circuit 187, which is shown in block form in FIG. 1, that generates a digital pulse synchronized to the ripple. Since the IF reference frequency determines the information update rate, it also determines (by a factor of 2) the rate at which ripple appears on the output signal. Preferably, the digitization rate is lower than the IF reference waveform, for example by a factor of eight. Therefore, the IF reference square wave 175 (FIG. 1) from the second electrical circuit 173 is input to a frequency divider 1205 that provides a predetermined submultiple of the IF reference frequency. The frequency-divided output is applied to a phase shifting network 1210 to cause the sample to be taken at the optimum point in the output ripple waveform. The phase shifting network delays the sampling signal for a predetermined time period based, for example on calculations and experimental results. Accordingly, the sampling signal is shifted to a time when each sample can provide a consistent output, preferably at the zero-axis crossing of the ripple. The shifted output from the phase shifter 1210 is then applied to an (optional) pulse shaping circuit 1215 that shapes the output of the phase shifting network to a logic signal appropriate for use as a sampling signal in the A/D converter 185.

The calibration target 280 (FIG. 2) has a series of reflective steps 295 at predefined distances with respect to the optical unit 210. During a measuring operation, the laser scans the calibration target, and the phase detector output, indicative of the phase difference of the reflected radiation from each of the steps, is noted together with its predefined distance. Thereby, each subsequent measurement from the scene can be calibrated with known values during data processing. Advantageously, use of the calibration target in the scene allows precise measurements and high consistency between measurements.

Figure 13:
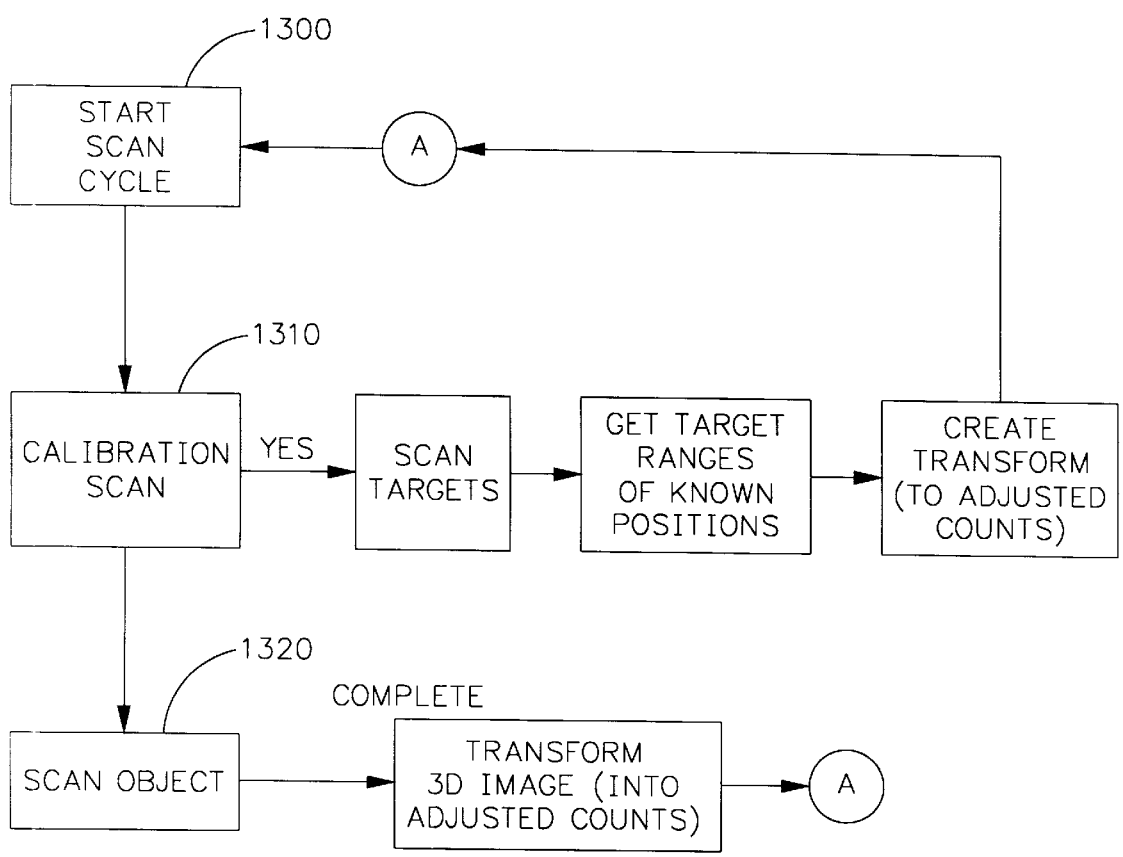
FIG. 13 is a flow chart of steps for using the calibration targets during processing of data.

FIG. 13 is a flow chart of operations for calibration. Calibration is performed in order to convert input range count values into adjusted values through, at least, one or more known target positions. Calibration targets at given range distances (in inches or millimeters) from the scanner are assigned fixed range counts for their positions.

The scan cycle begins at 1300, and beginning at 1310, the targets are scanned and their input range counts are compared against their assigned counts. This comparison yields the offset values necessary to correct the measured to the fixed count values for the actual distance in inches (or millimeters). When calibration is completed, operation moves from box 1310 to box 1320, and the adjusted range count couplets are stored to be used to transform scan objects of unknown positions, from input range counts to adjusted range count values. Depending on the application, these couplets can be averaged to a single offset constants converting values over short ranges; put into tables for linear interpolation over larger ranges; or expanded into a two dimensional array of pixel transform values for fast throughput performance.

TRANSPORTING PARCEL APPLICATION

Figure 14A:
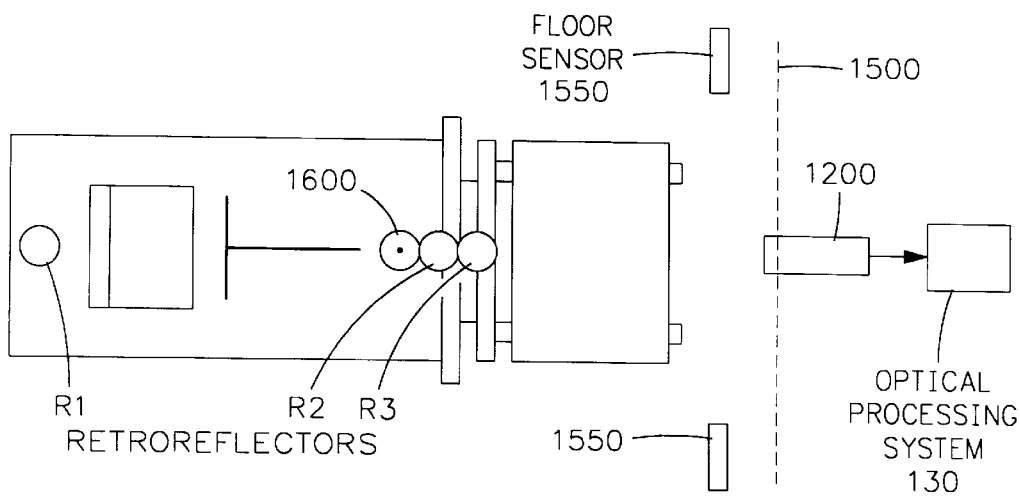
FIG. 14A is a top view of an exemplary view of a cargo system of the instant invention using a fork-lift as an exemplary transporting machine of parcels using the invention.
Figure 14B:
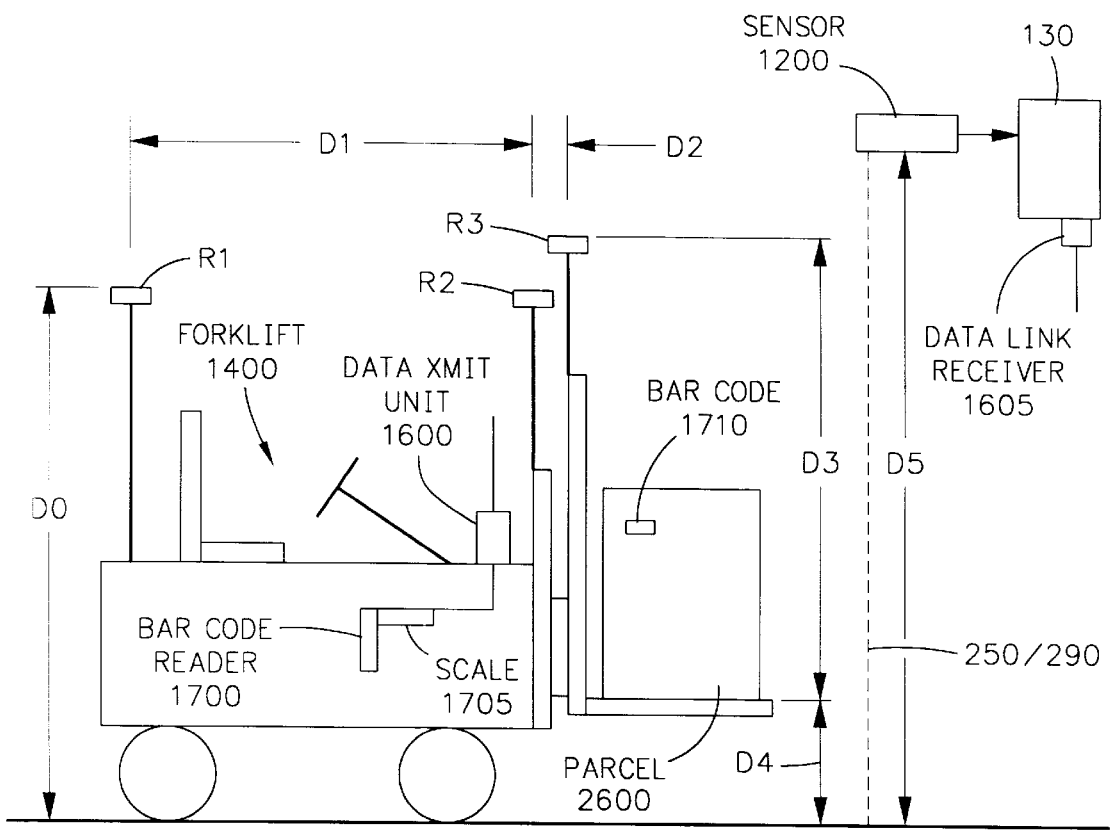
FIG. 14B is a side view of FIG. 14A.

In FIGS. 14A and 14B, an exemplary application of the inventions ranging and scanning sensor is depicted for monitoring dimensional weight and identification of parcel shipments using a transporting machine. The application of the invention's ranging and scanning sensor in combination with a parcel transporting machine that improves shipping efficiency. The preferred transporting machine is a forklift that can readily move pallets carrying parcels. The 3-D imagery of the parcel items 2600 located on the forklift 1400 provides using the methods and apparatus of the above invention enable volumetric determination and subsequent conversion to "Dimensional Weight (DIM WT)". The shipper then compares actual weight with the DIM WT and selects the greater of the two to determine tare.

Figure 15:
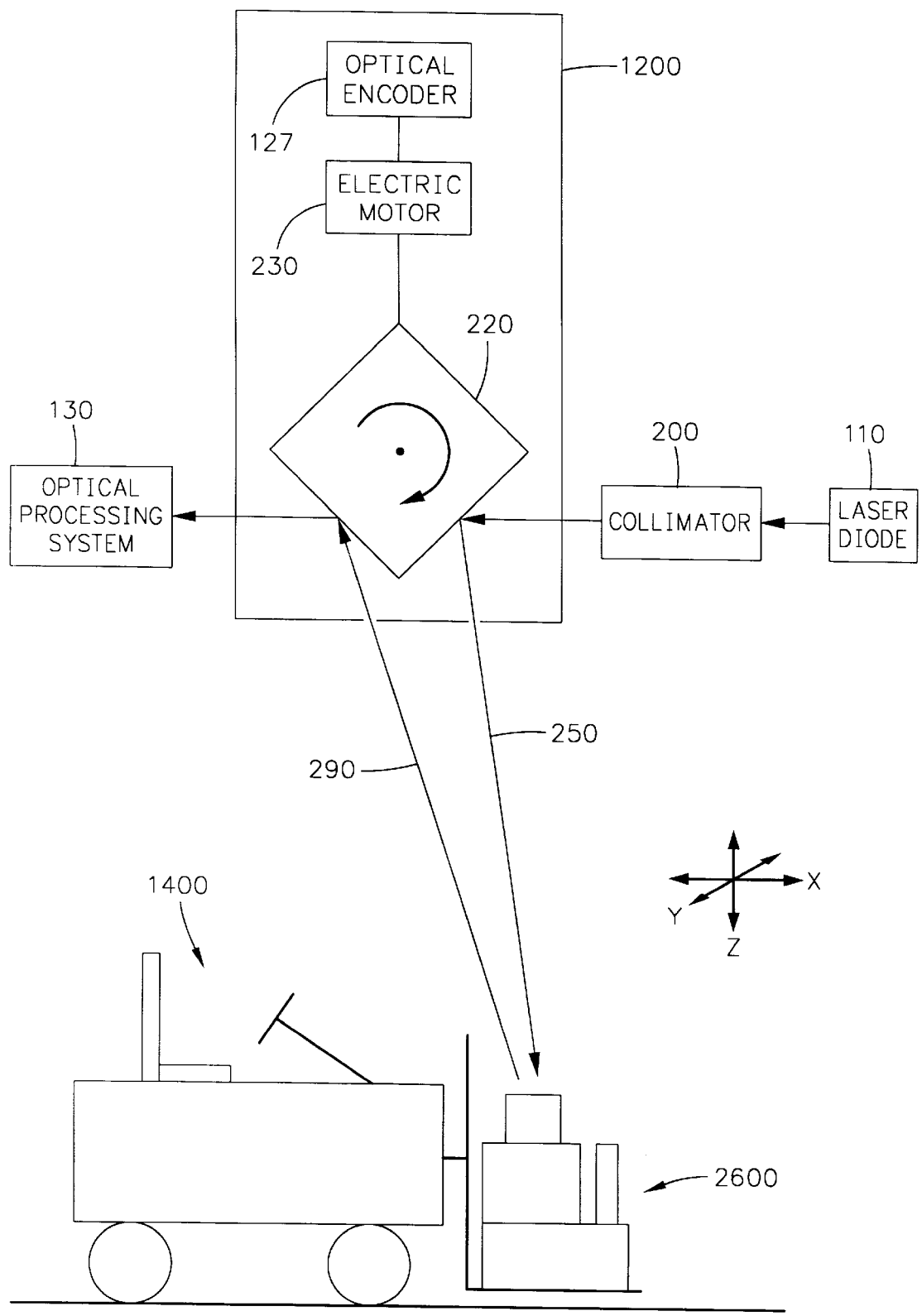
FIG. 15 is a diagram illustrating the optical scanning system and the embodiment shown in FIG. 14A and 14B.

The preferable 3-D optical scanning system is a modified version of optical scanning system shown in FIG. 2 which is without use of a large scanning mirror 225 and the gears 235 used to drive the mirror 225. The modified optical scanning system is shown in FIG. 15. Removing this mirror 225 allows the single remaining mirror in the sensor 1200 to scan the laser beam as a line in one plane 1500 ( FIG. 14A). By driving the forklift 1400 through the laser beam 250 in that scans in the plane 150, the laser beam generates multiple scan lines 1800 (FIG. 16) across the forklift and the parcel 2600 carried on the forklift tines. The resultant image is a composite of a top view of the forklift and parcels 2600 on the forklift tines.

Figure 16:
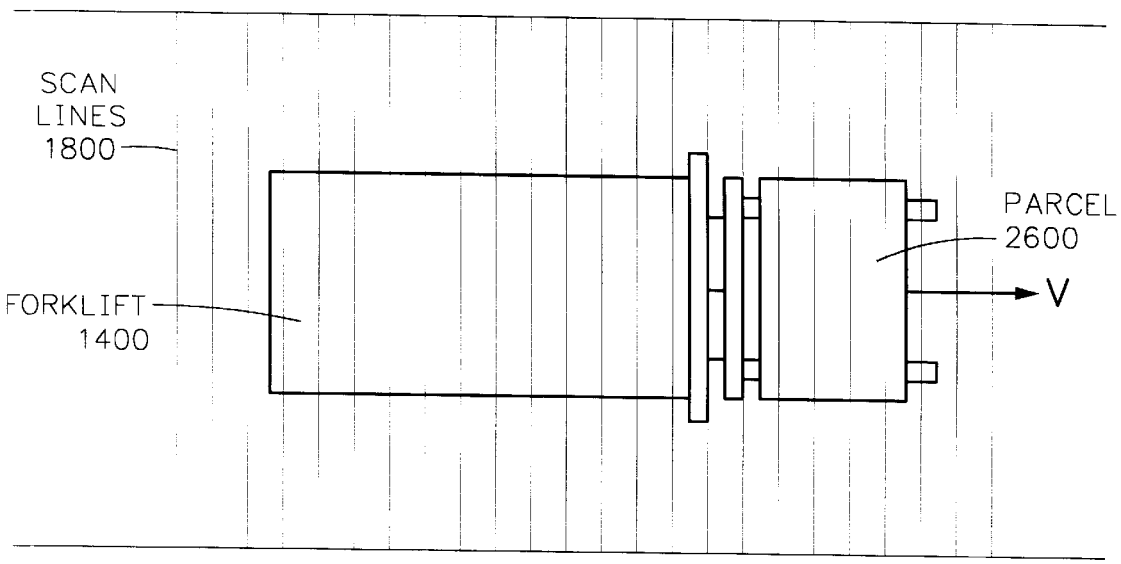
FIG. 16 is a top view of the forklift in operation as FIGS. 14A and 14B that illustrates scanning of a forklift.

In FIG. 15, the motor 230 in the sensor 1200 rotates at a constant R.P.M. generating a constant number of scan lines per second. As the forklift goes through the viewing field of the beam, a 3-D image is generated comprising a number of scan lines 1800 across the forklift (FIG. 16). At low velocity, the number of scan lines across the forklift is large. If the forklift traverses the beam at higher speeds, the number of scan lines across the forklift will be smaller. The fact that the forklift can traverse the beam at any arbitrary velocity constitutes the major problem that this invention solves which is being able to determine the volume of the parcels of cargo regardless of the velocity of the forklift. Under practical operational conditions, the velocity of the forklift can be any value within the capability of the forklift.

The modified scanning sensor 1200 is also shown in FIGS. 14A and 14B. The sensor 1200 is a modified version of that discussed above and shown as unit 120 in FIG. 2. The modified sensor 1200 has all the components except for the second mirror 225 and gears 235. The remainder of sensor system operates with the ranging scanner system as shown in FIG. 1. As described above, the sensor 1200 is attached and placed 12 to 15 feet above a ground level D5 (FIG. 14B) to allow unrestricted movement of the forklift while 3-D imagery is being acquired.

During operation, the single mirror 220 scans with the laser beam 250 and the reflected beam 290 all in a single plane 1500. The scan line of the laser beam 250 occurs on the ground plane in a continually repeating straight line that remains in the single plane 1500 (FIG. 14A). A 3-D image is obtained by the sensor 1200 when a forklift operator drives the forklift 1400 through a center of the planar scanning laser beam 250 "curtain" and received reflected beam 290. As the forklift 1400 with parcel 2600 traverses the beam 250, the constant scanning of the line results in a number of scan lines 1800 (FIG. 16) across the forklift, and cargo items, being acquired. Each scan line 1800 contains several hundred, individual range measurement points which provide a "topographic profile" of the forklift 1400 at the point the scan line was acquired. Since each range point represents a small length, width and height element in the image, it can be thought of as a volume element and is referred to as a "voxel." The individual range measurements are approximately 0.1-inches apart along the scan line and the data rate is 500,000 range measurements per second. As the scan lines 1800 are acquired, they are digitized and transmitted to the optical processing system 130 (Fig. 1) which includes the computer 195 wherein the required computations are performed.

Proper correlation of the 3-D image to measured values of a parcel 2600 is dependent upon a methodology that encompasses velocity of a moving forklift 1400 as it traverses the laser scanning beam 250 and reflected beam 290.

The positions of R1 and R2 are a known fixed distance between retroreflectors which are mounted to the mover equipment along the centerline of the forklift's longitudinal axis (axis which is parallel to the forklift's velocity vector) at a height of at least ten inches above the top of the mover. This positioning of the retroreflectors allow the scanner system to properly calibrate line scanning of an image so that calibration of the aspect and height of a parcel can be determined having known individual voxels containing length, width and height data from the scanner system (the "voxel" is one range pixel in the scene image). The voxel is a picture element in a video display capturing the depth of the object by the shades of grey or color. In the system of FIG. 1 for example, voxels appear generally dark if they are close to the scanner system and lighter if the object is further from the scanner system. Also, the system is calibrated to determine accurately the volume of a parcel. The required methodology is obtained by attaching three retroreflectors R1, R2 and R3 at positions above the forklift that can be properly observed by the sensor 1200. These retroreflectors are preferably made by TECH SPEC™ corner cube type retroreflectors, model D45203, and are mounted on a pole which features the retroreflectors above the transporting machine. The three retroreflectors R1, R2 and R3 are preferably placed along the longitudinal centerline of the forklift 1400 (FIG. 14A). The two retroreflectors R1 and R2 are place at the rear are placed at an accurately known horizontal distance apart D1. The two front retroreflectors R2 and R3 are placed at a known horizontal distance apart D2 with the condition that D2 is measured with the forklift tines being horizontal to the ground. In addition, the front retroreflector R3 is placed on the moving forklift head such that the distance D3 will always remain constant regardless of the height that the operator has raised or lowered the forklift head. Thus, D4 will be dependent on the height that the forklift head is set by the operator. The retroreflectors R1, R2 and R3 are attached to the forklift with a long small diameter rigid rod. This arrangement allows placing the retroreflectors such that D1 and D2 are constant regardless of forklift manufacturer or forklift model.

During actual operations, the operator picks up parcels generally placed on pallets, skids or comparable transport surface constituting a flat planar surface. For proper identification of a parcel 2600, a bar code 1710 is attached thereto wherein the bar code is read by the operator with a bar code reader 1700 placed on the forklift and the bar code number is stored in a small data memory located in a radio frequency data transmitting unit 1600 located on the forklift. Whenever the forklift head is raised above the floor during parcel transport, a scale 1705 built into the forklift head typically being a load cell unit weighs the parcels and also stores the actual weight in memory of the data transmitting unit 1600. The forklift driver then moves the forklift to pass through the center of the scanning laser beam in a direction perpendicular to the scan line on the floor. As the forklift passes a floor sensor 1550 just prior to the floor scan plane 1500, the optical sensor 1550 detects the passage of the forklift and provides a "start signal" to the 3-D sensor 1200 to acquire a 3-D image. At the same time, a "transmit" signal is sent to the forklift memory unit 1600 by a signal generated by the optical sensor 1200 resulting in the bar code number and actual weight of the parcel being transmitted to the 3-D sensor computer 195 via the RF data link to the data link receiver 1605 and both parameters are stored in computer memory for later use. The data read by the RF data link receiver 1605 is relayed to the computer via a "wedge" type hard wire data link that can ultimately be processed by a central parcel processing system for printing shipping reports that identify individual parcels processed by the invention.

The computer processing of the 3-D image is accomplished in several steps that include:

Step 1: The computer 195 has preprogramed information as to the two rear retroreflectors R1 and R2 that are at a distance X1 [X1=(D5−D0)] from the sensor head 1200. The first step is to locate all non-zero range elements in the image that are at a range of X1 or closer to the sensor head 1200. This isolates the retroreflectors and ignores all data below the retroreflectors R1, R2 and R3. The computer then counts the number of scan lines (n) located between D1 and D2.

Step 2: Then, D1 is divided by (n−1) scan lines to determine the width of each scan line. The faster the forklift moves through the beam, the wider the scan lines will be. The slower the beam is traversed, the narrower the scan lines. This relationship is:

Line Width (LW)=D1/(n−1)     (inches per line)

Step 3: The computer then determines if D2 has changed due to tilting the forklift tines up or down from horizontal. Giving the modified D2 the new variable name D21, we then determine the horizontal distance (D22) that the third retroreflector has moved with the equation:

D22=D2−D21

The angle that the forklift head (deviation of the tines from horizontal) has been tilted is:

theta=Sin$^{-1}$(D22/D3)

Step 4: The computer then isolates the vertical space D3 that is below the level of the R3 retroreflector but above the top surface of the forklift tines, and forward of the R3 retroreflector. If the forklift tines have been tilted from horizontal, the image is corrected to remove the tilt from the individual range measurements. This volume, by definition, contains the parcel of cargo/packages. These parcels are then the basis of computation of the volume of the parcel. The image processing approach then determines the height of each range measurement point since the height of the forklift tines is known. The width and length of each of these points is also known. By taking the product of these three terms is an element of volume (voxel). By computing each voxel across the entire surface of the cargo/packages constituting the parcel and then summing these voxels, the total volume of the parcel is determined.

Figure 17:
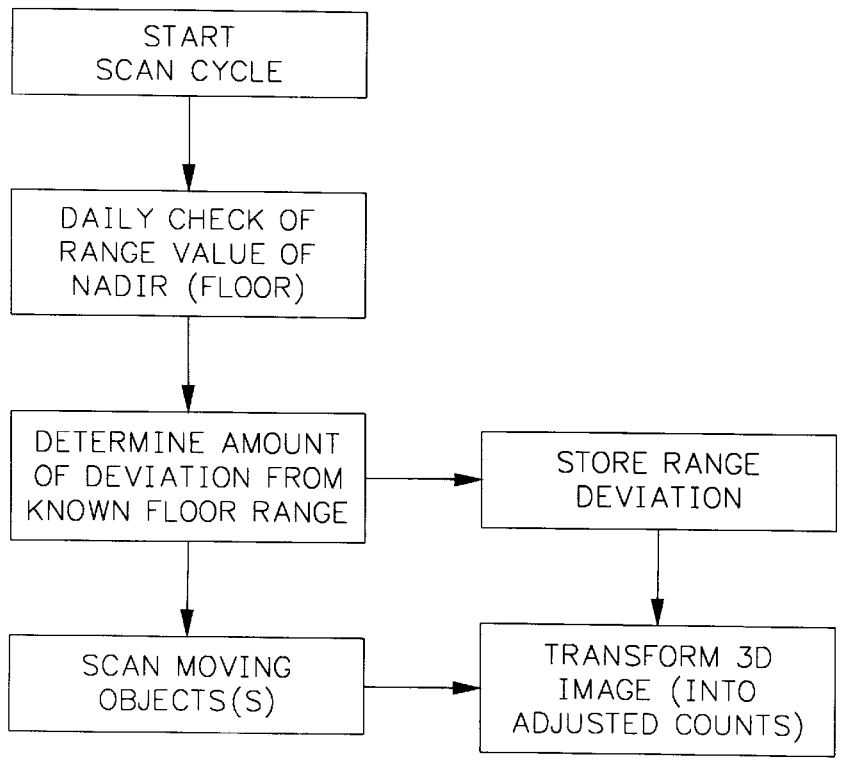
FIG. 17 is a flow chart of steps for calibrating the laser scanner sensor for use with the transporting machine of the instant invention.

FIG. 17 is a modified version of the flow chart showing a calibration procedure for the 3-D image system for use with the parcel transporting machine application. Calibration of the system is used to convert input range count values into adjusted counts values of the sequence of observed image range values contained in the individual scan lines. The reference plane is the floor on which the forklift moves. Calibration of system using the floor as the calibration point (in inches or millimeters) from the scanning permits adjustment of image range values if a change is noted. This adjustment yields the offset values necessary to correct the measured to the previously measured fixed count values for the actual distance in inches (or millimeters). The adjusted range count parameter is stored to be used to transform the height value of each voxel, from input range counts to adjusted range count values. Typical operation of the system includes daily calibration checks of the range counts of the floor at a NADIR position. If the range count value deviates from the value determined during system installation, then the processor 195 determines the positive or negative bias value of the count. This bias is then the correction factor used in determining the correct range value contained in a voxel during image processing activity by the scanning sensor system.

Additionally aspects for using the parcel transporting application of the invention can further include methods of using information derived from the dimensional weight and the identification of a parcel in shipment. This information can be stored within a memory of a central processing unit (network computer) of a parcel shipping system connected to computer 195 for use in a parcel processing application program. Outputs from the parcel shipping system can include a display of the calculated dimensions and weight of the parcel to be processed on a monitor. Essentially simultaneously, the calculations are input to a parcel processing program can apply the data against a look-up table of values that correspond to a shipping charge as determined by a carrier's dimensional weighing guidelines.

As can be appreciated by those skilled in the art, a number of variations of the subject invention are possible. These variations include, but are not limited to: the use of a stationary weighing scale as the moving parcel on a transporting machine moves within the field of measurement; the transporting machine can be an automated mover device; the speed and characteristics of the transporting machine used to transport parcels through the measurement field and, the general abilities of the parcel processing system application used. Additional variations include, but are not limited to: the bar code reader which can be a unit placed at a stationary location near the viewing field of measurement that can detect the bar code attached to the moving parcel, the scale measuring device can be gross large scale unit in which the transporting machine traverses and has known values of weight for the machine and/or operating personnel, the means for positioning the laser scanner sensor system relative to the viewing field of measurement and whether or not the entire parcel processing system is a stand alone system or a node within a larger network.

What is claimed is:

1. A method for measuring volume of a moving parcel, the method comprising placing a parcel on a forklift to which at least three retroreflectors are attached, the retroreflectors having a fixed geometrical relationship;

transmitting the parcel into a field of measurement;

transmitting a laser beam from a scanner sensor system transverse to a velocity vector of the forklift carrying the parcel;

reflecting the laser beam from the field of measurement containing the forklift and the parcel forming a scan image;

determining an aspect and a length, width and height of the parcel by processing the scan image in relation to measured distances between the retroreflectors and rate of motion of the retroreflectors; and determining a volume of the parcel.

2. The method of claim 1, further comprising measuring the weight of the parcel and then determining a dimensional weight of the parcel and affixing a bar code identification to the parcel.

3. The method of claim 2, further comprising reading the bar code prior to obtaining the scan image and transmitting parcel identification and weight information to a remote parcel processing system.

4. The method of claim 1, wherein the determination volume information of the parcel is transmitted to a parcel processing system.

5. The method of claim 2, wherein the determined parcel weight and identification is transmitted to the parcel processing system by using a scale weighing device and a bar code reader device attached to the forklift.

6. The method of claim 1, wherein the determining the volume of the parcel comprises:

taking known information of two rear-most retroreflectors R1 and R2 attached to the transporting machine with known distance from the scanner sensor thereby determining all non-zero range elements in the scan image that are at a known range from the scanner sensor system and isolating the retroreflectors image in the scan field;

counting a number of scan lines between the retroreflectors R1 and R2 in the scanning image;

dividing the known distance between retroreflectors R1 and R2 by (n−1) wherein n is the number of scan lines thereby determining a width of each scan line;

determining tilt of tines of the forklift by a calibrated distance D2 by the scanner sensor system wherein D2 is defined as the horizontal distance between the retroreflectors R1 and R2 with the forklift tines being horizontal;

isolating the parcel in the scan image a vertical space which resides above a top surface of the forklift tines, and forward of the R3 retroreflector, which is defined as the isolated scan image;

correcting the scan image measurements from determined tilt of the tines of the forklift;

abstracting from the isolated scan image the volume of the parcel by the scanner sensor system by summing the product of height, length and width of each range measurement point (voxel) of the aspect which yields the volume of the parcel.

7. A method for measuring volume of a transported parcel in motion, the method comprising the steps of:

placing and moving a parcel by a transporting machine comprising a forklift having at least three retroreflectors, a scale weighing device, and a bar code reader device;

transporting the parcel through a scanning field of measurement;

transmitting a scanning laser beam from a laser scanner sensor system transverse to an axis of directional motion of the transporting machine;

receiving a reflected beam from the field of measurement by the laser scanner sensor system forming a scan image of the parcel and the transporting machine including the at least three retroreflectors;

measuring weight of the parcel and determining a dimensional weight of the parcel and affixing a bar code identification to the parcel, wherein the measured parcel weight and identification information is transmitted to a parcel processing system by use of the scale weighing device and the bar code reader device;

determining an aspect and a height of the parcel by processing the scan image in relation to rate of motion of the transporting machine; and determining the volume of the parcel including the preliminary steps of calibrating the scanner sensor system measurements by determining scan line distance between each of the at least three retroreflectors resulting from the rate of motion of the transporting machine.

8. The method of claim 7, wherein the laser scanner sensor system comprises a waveform generator that generates a predetermined reference waveform, a laser diode that supplies an intensity-modulated laser beam responsive to the reference waveform, and an optical scanning system for scanning the transported parcel with the intensity-modulated laser beam and receiving reflected intensity-modulated light from the parcel in the field of measurement, the method further comprising the steps of:

situating at least three retroreflectors within the field of measurement, the at least three retroreflectors having known distance and angular relationship to each other;

scanning the field of measurement with the intensity-modulated laser beam to provide intensity-modulated reflected light from the parcel in the field of measurement with an optical scanning system having a scanning mirror for line scanning;

processing the intensity-modulated light reflected from the parcel in the field of measurement, including transmitting a first percentage of light reflected from a maximum object distance in the scan image and a second, smaller percentage of light reflected from closer objects in the scan image;

applying the processed intensity-modulated light to a photodetector to provide an amplitude-modulated electrical range signal;

converting the range signal into a converted waveform that has falling and rising edges that correspond to the zero crossings in the amplitude-modulated range signal;

converting the reference waveform into a second converted waveform that has falling and rising edges that correspond to the zero crossings in the reference waveform;

detecting the phase difference between the first and second converted waveforms and providing a phase difference signal indicative of distances to all objects residing in the field-of-view including the parcel and the retroreflectors; and processing the phase difference signal using information from the retroreflectors to calibrate line width measurements which are used to define distances across the parcel in the field of measurement.

9. The method of claim 7, wherein the step of determining of the volume of the parcel comprises the steps of:

taking known information of two rear-most retroreflectors R1 and R2 attached to the transporting machine with known distance from the scanner sensor thereby determining all non-zero range elements in the scan image that are at a known range from the scanner sensor system and isolating the retroreflectors image in the scan field;

counting a number of scan lines between the retroreflectors R1 and R2 in the scanning image;

dividing the known distance between retroreflectors R1 and R2 by (n−1) wherein n is the number of scan lines thereby determining a width of each scan line;

determining tilt of tines of the forklift by a calibrated distance D2 by the scanner sensor system wherein D2 is defined as the horizontal distance between the retroreflectors R1 and R2 with the forklift tines being horizontal;

isolating the parcel in the scan image a vertical space which resides above the top surface of the forklift tines, and forward of the R3 retroreflector, which is defined as the isolated scan image;

correcting the scan image measurements from determined tilt of the tines of the forklift;

abstracting from the isolated scan image the volume of the parcel by the scanner sensor system by summing the product of height, length and width of each range measurement point of the aspect which yields the volume of the parcel.

10. A system for measuring volume of a parcel moving in a field of measurement, the system comprising:

a supporting means for supporting and transporting a parcel placed thereupon for measurement in a scanning field of measurement, the supporting means comprising a forklift having at least three retroreflectors and means for measuring weight of the parcel, wherein the means for measuring weight is structurally interconnected to the tines of the forklift;

a laser scanner sensor means for scanning a predetermined field for measurement data wherein the measurement data is representative of said parcel's aspect and height above a reference plane in relation to the scanner sensor means wherein:

(a) the scanner sensor means is positioned at a predetermined location in relation to the supporting means, (b) the scanner sensor means emits a beam at the supporting means which transversely scans the supporting means while moving through the field of measurement, and (c) the scanner sensor means receives a reflection of the emitted beam and the received beam is used to determine the measurement data from reflected light from the scanning field of measurement; and processor means for determining the parcel's aspect and height from the measurement data and outputting a volumetric measurement of the parcel.

11. The system of claim 10, wherein the volumetric measurement is transmitted to a parcel processing system including means for determining a shipment cost for transporting the parcel to a destination which comprises means for:

(a) receiving and essentially simultaneously processing measurement data from the laser scanner sensor means;

(b) transmitting the measurement data to the calculator means to determine the actual measurements based on a pre-selected measurement scale;

(c) receiving the actual measurements from the calculator means; and (d) transmitting the actual measurements to a parcel processing system;

wherein the means for determining establishes a shipment cost for transporting the parcel to a destination as a function of the actual measurements as applied to a rate table.

12. The system of claim 10, wherein the laser scanner sensor means comprises:

a waveform generator that generates a predetermined reference waveform;

a laser diode that supplies an intensity-modulated laser beam responsive to the reference waveform;

an optical scanning system for scanning the field of measurement with the intensity-modulated laser beam and receiving reflected intensity-modulated light from the objects in the field of measurement, the system includes a scanning mirror for line scanning;

optical means for processing said reflected intensity-modulated light, said optical means including an intensity-control aperture that transmits a first percentage of light reflected from the maximum object distance in the field of measurement and a second, lesser percentage of light reflected from objects closer than the maximum object distance in the field of measurement;

a photodetector positioned to receive said processed intensity-modulated light from the optical means, said photodetector converting energy in said light into an amplitude-modulated range signal;

a first electrical circuit for converting the amplitude-modulated range signal into a converted waveform that has falling and rising edges that correspond to the zero crossings in said amplitude-modulated range signal;

a second electrical circuit for converting the reference waveform into a second converted waveform that has falling and rising edges that correspond to the zero crossings in said reference waveform;

a phase comparator coupled to receive said first and second converted waveforms and output a signal indicative of the phase difference therebetween; and wherein the processor means includes means for calibrating a measurement of distances to the objects in the field of measurement.

* * * * *